US011383456B2

(12) United States Patent
Hamlin et al.

(10) Patent No.: US 11,383,456 B2
(45) Date of Patent: Jul. 12, 2022

(54) FORMING FUNNEL FOR CONSTRAINING CUSHIONED MAILERS AS WELL AS SYSTEM AND METHOD FOR CLOSING AN OPENING OF A MAILER

(71) Applicant: Sealed Air Corporation (US), Charlotte, NC (US)

(72) Inventors: Christopher C. Hamlin, Worcester, MA (US); Thomas P. Orsini, Sterling, MA (US); Patrick G. White, Westford, MA (US); Russell T. Christman, Dunstable, MA (US)

(73) Assignee: Sealed Air Corporation (US), Charlotte, NC (US)

( * ) Notice: Subject to any disclaimer, the term of this patent is extended or adjusted under 35 U.S.C. 154(b) by 0 days.

(21) Appl. No.: 17/046,983

(22) PCT Filed: Apr. 12, 2019

(86) PCT No.: PCT/US2019/027166
§ 371 (c)(1),
(2) Date: Oct. 12, 2020

(87) PCT Pub. No.: WO2019/200220
PCT Pub. Date: Oct. 17, 2019

(65) Prior Publication Data
US 2021/0154949 A1 May 27, 2021

Related U.S. Application Data

(60) Provisional application No. 62/657,198, filed on Apr. 13, 2018.

(51) Int. Cl.
*B29C 65/00* (2006.01)
*B29C 65/22* (2006.01)
(Continued)

(52) U.S. Cl.
CPC ............ *B29C 66/849* (2013.01); *B29C 65/22* (2013.01); *B29C 65/787* (2013.01);
(Continued)

(58) Field of Classification Search
CPC .............. B43M 5/04; B29L 2031/7176; B29C 65/7891; B29C 66/43121; B29C 66/81465; B29C 66/83413; B29C 66/836
See application file for complete search history.

(56) References Cited

U.S. PATENT DOCUMENTS 1,487,047 A    3/1924  Clarke
4,004,963 A    1/1977  Denker
(Continued)

FOREIGN PATENT DOCUMENTS

CN    2082690 U    8/1991
CN    2383665 Y    6/2000
(Continued)

*Primary Examiner* — Daniel McNally
(74) *Attorney, Agent, or Firm* — Jon M. Isaacson

(57) ABSTRACT

A system (300) for closing mailers includes a forming funnel (320) and a fusing device (310). The forming funnel includes funneling surfaces that receive an opening of a mailer in an insertion direction (302) and constrain the opening of the mailer after the opening of the mailer is inserted. The funneling surfaces are arranged to continue constraining the opening of the mailer as the mailer moves in a sliding direction (304). The fusing device includes a slot that receives the constrained opening of the mailer from the forming funnel. The fusing device applies pressure and heat to the opening of the mailer as the opening of the mailer moves through the slot. The pressure and the heat applied by the fusing device cause portions of the opening to fuse together to close the mailer.

18 Claims, 16 Drawing Sheets

(51) Int. Cl.
*B29C 65/78* (2006.01)
*B43M 5/04* (2006.01)
*B29L 31/00* (2006.01)

(52) U.S. Cl.
CPC ...... *B29C 65/7891* (2013.01); *B29C 66/0222* (2013.01); *B29C 66/1122* (2013.01); *B29C 66/43121* (2013.01); *B29C 66/727* (2013.01); *B29C 66/72328* (2013.01); *B29C 66/81465* (2013.01); *B29C 66/836* (2013.01); *B29C 66/83413* (2013.01); *B43M 5/04* (2013.01); *B29L 2031/7176* (2013.01)

(56) References Cited

U.S. PATENT DOCUMENTS

| | | |
|---|---|---|
| 4,071,997 A | 2/1978 | Gunther et al. |
| 4,202,721 A | 5/1980 | Roberts |
| 5,149,393 A | 9/1992 | Hutchinson et al. |
| 5,378,304 A | 1/1995 | Denker |
| 6,195,966 B1 | 3/2001 | Shomron et al. |
| 8,726,960 B1 * | 5/2014 | Huang .............. B29C 66/81427 156/359 |
| 2004/0000581 A1 | 1/2004 | Brandolini et al. |
| 2019/0091941 A1 * | 3/2019 | Uttaro .................. B29C 66/961 |

FOREIGN PATENT DOCUMENTS

| | | |
|---|---|---|
| CN | 203157294 U | 8/2013 |
| EP | 1260353 A2 | 11/2002 |
| GB | 1164481 A | 9/1969 |
| GB | 1330398 A | 9/1973 |

* cited by examiner

FORMING FUNNEL FOR CONSTRAINING CUSHIONED MAILERS AS WELL AS SYSTEM AND METHOD FOR CLOSING AN OPENING OF A MAILER

BACKGROUND

The present disclosure is in the technical field of filling mailers. More particularly, the present disclosure is directed to systems and methods for closing the openings of cushioned mailers.

A wide variety of objects, including fragile items, are transported in various types of mailing envelopes, sometimes referred to as "mailers." In some cases, these mailers have cushioning to provide some level of protection for the objects transported therein. The outer walls of cushioned mailers are typically formed from protective materials, such as Kraft paper, cardstock, polyethylene-coated paper, other paper-based materials, polyethylene film, or other resilient materials. The inner walls of cushioned mailers are lined with cushioning materials, such as air cellular material (e.g., BUBBLE WRAP™ air cellular material sold by Sealed Air Corporation), foam sheets, or any other cushioning material. The outer walls are typically adhered (e.g., laminated) to the cushioning material when forming the mailers.

When packaging a cushioned mailer, a user typically obtains an empty mailer, retracts a flap to expose an opening of the mailer, inserts one or more objects into the mailer, removes a release liner over an adhesive strip, and then adheres the flap closed to cover the opening. Once the flap is adhered closed, the cushioned mailer can be shipped to a recipient of the one or more objects. Cushioned mailers are convenient because they can be packaged quickly. Also, because the cushioning material is built in to the walls of the cushioned mailer, users to not need significant training to understand how to properly protect the objects inside the cushioned mailers. These efficiencies make cushioned mailers a popular shipping container among mass shippers, such as e-commerce retailers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one embodiment, a system includes a forming funnel and a fusing device. The forming funnel includes funneling surfaces arranged to receive an opening of a mailer in an insertion direction between the funneling surfaces and to constrain the opening of the mailer after the opening of the mailer is inserted between the funneling surfaces. The funneling surfaces are arranged such that, after the opening of the mailer is inserted between the funneling surfaces, the funneling surfaces continue to constrain the opening of the mailer as the mailer is moved in a sliding direction. The fusing device includes a slot configured to receive the constrained opening of the mailer from the forming funnel as the mailer is moved in the sliding direction. The fusing device is configured to apply pressure to an exterior of the opening of the mailer as the opening of the mailer is moved through the slot and to apply heat to the opening of the mailer as the opening of the mailer is moved through the slot. The pressure and the heat applied by the fusing device cause portions of the opening to fuse together to close the mailer.

In one example, the insertion direction is substantially perpendicular to the sliding direction. In another example, the fusing device further includes a first set of rollers on a first side of the slot and a second set of rollers on a second side of the slot, where the first set of rollers is configured to contact a first side of the exterior of the opening of the mailer as the opening of the mailer is moved through the slot, where the second set of rollers is configured to contact a second side of the exterior of the opening of the mailer as the opening of the mailer is moved through the slot, and where the first and second sets of rollers are configured to apply the pressure to the exterior of the opening of the mailer. In another example, the fusing device further includes a conveying system configured to convey the opening of the mailer through the at least a portion of the slot that includes the first and second sets of rollers. In another example, the conveying system includes a continuous band arranged to pass along the first set of rollers. In another example, the system further includes a driving system configured to drive the continuous band. In another example, the mailer is configured to be inserted into the forming funnel manually and moved in the sliding direction manually until the opening of the mailer reaches the continuous band, and the driving of the continuous band moves the mailer in the sliding direction through the first and second sets of rollers. In another example, the exterior of the opening of the mailer include a first ply of paper on the first side of the exterior of the opening and a second ply of paper on the second side of the exterior of the opening, where an inner surface of each of the first and second plies of paper has an air cellular material adhered thereto. In another example, the pressure and the heat applied to the opening of the mailer causes at least a portion of the air cellular material on the first ply of paper to fuse with at least a portion of the air cellular material on the second ply of paper. In another example, the portions of the opening fused together to close the mailer include a heat seal in the air cellular material on the first and second plies of paper, and the heat seal is formed by the pressure and the heat applied by the fusing device.

In another example, the fusing device further includes an upper heating element configured to apply heat to an upper side of the opening of the mailer and a lower heating element configured to apply heat to a lower side of the opening of the mailer. In another example, the fusing device further includes an upstream set of nip rollers located upstream of the upper and lower heating elements and a downstream set of nip rollers located downstream of the upper and lower heating elements, where the upstream set of nip rollers are configured to apply pressure to the opening of the mailer before the opening of the mailer passes between the upper and lower heating elements, and where the downstream set of nip rollers are configured to apply pressure to the opening of the mailer after the opening of the mailer passes between the upper and lower heating elements.

In another embodiment, a forming funnel includes a closed end, an open end, a first funneling surface extending between the closed end and the open end, and a second funneling surface extending between the closed end and the open end. The first and second funneling surfaces are arranged to receive an opening of a mailer in an insertion direction between the first and second funneling surfaces. The first and second funneling surfaces are arranged to constrain a first side of the opening of the mailer and a second side of the opening of the mailer, respectively, as the opening of the mailer is inserted between the first and second funneling surfaces. The first and second funneling surfaces are arranged such that, after the opening of the mailer is inserted between the first and second funneling surfaces, the mailer can be moved in a sliding direction while the first and second funneling surfaces continue constraining the first and second sides of the opening.

In one example, the open end is configured to permit the mailer to be slid out of the forming funnel in the sliding direction. In another example, each of the first and second funneling surfaces has a substantially constant cross section between the closed end and the open end. In another example, portions of the first and second funneling surfaces are substantially parallel to each other to form a slot that extends between the closed end and the open end, the slot is configured to constrain the opening of the mailer when the mailer is moved in the sliding direction. In another example, a portion of the first funneling surface between the slot and a front of the forming funnel includes a first planar surface, a portion of the second funneling surface between the slot and the front of the forming funnel includes a second planar surface, the first planar surface and the second planar surface are not parallel to each other, and each of the first and second planar surfaces is not parallel to the portions of the first and second funneling surfaces that form the slot. In another example, the portion of the first funneling surface between the slot and the front of the forming funnel further includes a third planar surface, the first and third planar surfaces are not parallel to each other, the portion of the second funneling surface between the slot and the front of the forming funnel includes a fourth planar surface, the second and fourth planar surfaces are not parallel to each other; the third planar surface and the fourth planar surface are not parallel to each other, and each of the third and fourth planar surfaces is not parallel to the portions of the first and second funneling surfaces that form the slot. In another example, a portion of the first funneling surface between the slot and a front of the forming funnel includes a first contoured surface, and a portion of the second funneling surface between the slot and the front of the forming funnel includes a second contoured surface.

In another example, a first portion of the first funneling surface has a substantially constant cross section, a second portion of the first funneling surface has a non-constant cross section, the first portion of the first funneling surface extends between the closed end and the second portion, the second portion of the first funneling surface extends between the first portion and the open end; and an average distance between the first and second funneling surfaces at the open end is less than an average distance between the first and second funneling surface at the closed end. In another example, a first portion of the second funneling surface has a substantially constant cross section, a second portion of the second funneling surface has a non-constant cross section, the first portion of the second funneling surface extends between the closed end and the first portion, and the second portion of the first funneling surface extends between the first portion and the open end. In another example, the second funneling surface has a substantially constant cross section. In another example, at least one of the first and second funneling surfaces is movable with respect to the other of the first and second funneling surfaces.

In another embodiment, a method of closing an opening of a mailer includes inserting an object into a mailer through an opening of the mailer. The method further includes inserting the opening of the mailer between funneling surfaces of a forming funnel, where the funneling surfaces are arranged to constrain the opening of the mailer after the opening of the mailer is inserted between the funneling surfaces. The method further includes sliding the opening of the mailer in a sliding direction through the forming funnel, through an open end of the forming funnel, and into a fusing device. The funneling surfaces are arranged to continue constraining the opening of the mailer as the mailer is moved through the forming funnel in the sliding direction, and the fusing device includes a slot configured to receive the constrained opening of the mailer from the forming funnel. The method further includes bringing the opening of the mailer into contact with a conveying system in the slot of the fusing device. The conveying system is configured to convey the opening of the mailer through at least a portion of the slot where the fusing device is configured to apply pressure to an exterior of the opening of the mailer and to apply heat to the opening of the mailer. The pressure and the heat applied by the fusing device cause portions of the opening to fuse together to close the mailer.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The present disclosure describes embodiments of systems and methods for closing the openings of cushioned mailers. More particularly, the present disclosure describes embodiments of forming funnels that are capable of constricting an opening of a mailer as the opening of the mailer inserted between funneling surfaces of the forming funnels. In some embodiments, once the opening of the mailer has been inserted between the funneling surfaces in an insertion direction, the mailer can be slid in a sliding direction while the funneling surfaces continue to constrain the opening of the mailer. The present disclosure also describes embodiments of fusing devices that are capable of fusing portions of the opening of the mailer to close the mailer. In some embodiments, the fusing device includes a slot that receives the constrained opening of the mailer from the forming funnel. In some embodiments, the fusing device applies pressure and heat to the opening of the mailer to cause portions of the opening to fuse together to close the mailer.

As noted above, cushioned mailers are convenient because they require minimal training for a user to be able to place an object inside the mailer and adhere a flap closed over the opening. However, there are a number of drawbacks to cushioned mailers. In one example, of the total cost to manufacture mailers, the adhesive strip covered by a release liner can be a relatively high percentage. Not only does the addition of the adhesive and the release liner require extra steps in the manufacturing process, the cost of the materials for the adhesive and the release liner can be relatively high compared to the cost of the rest of the materials in the mailer. In another example, of the total time it takes a user to package a cushioned mailer, a majority of the time can be taken up by opening the flap and holding the flap open to insert the object, removing and discarding the release liner after the object has been inserted into the mailer, and adhering the flap closed. The amount of time taken for these tasks may only be a few seconds to package each mailer; however, this time taken for each mailer can accumulate over multiple mailers and become a significant problem, particularly in high-volume packaging facilities. In another example, the removed release liners generate excess waste. While each release liner itself is relatively small, the volume of disposed release liners generated in high-volume packaging facilities is not insignificant. In another example, many failures of mailer packaging are associated with the flap and/or the adhesive strip. These failures can include premature exposure of the adhesive resulting in the adhesive being adhered to the object that is intended to be inserted into the mailer, adhesion of the flap to itself instead of adhering the flap over the opening, tearing of the flap before it is adhered over the opening, and the like.

Figure 1A:
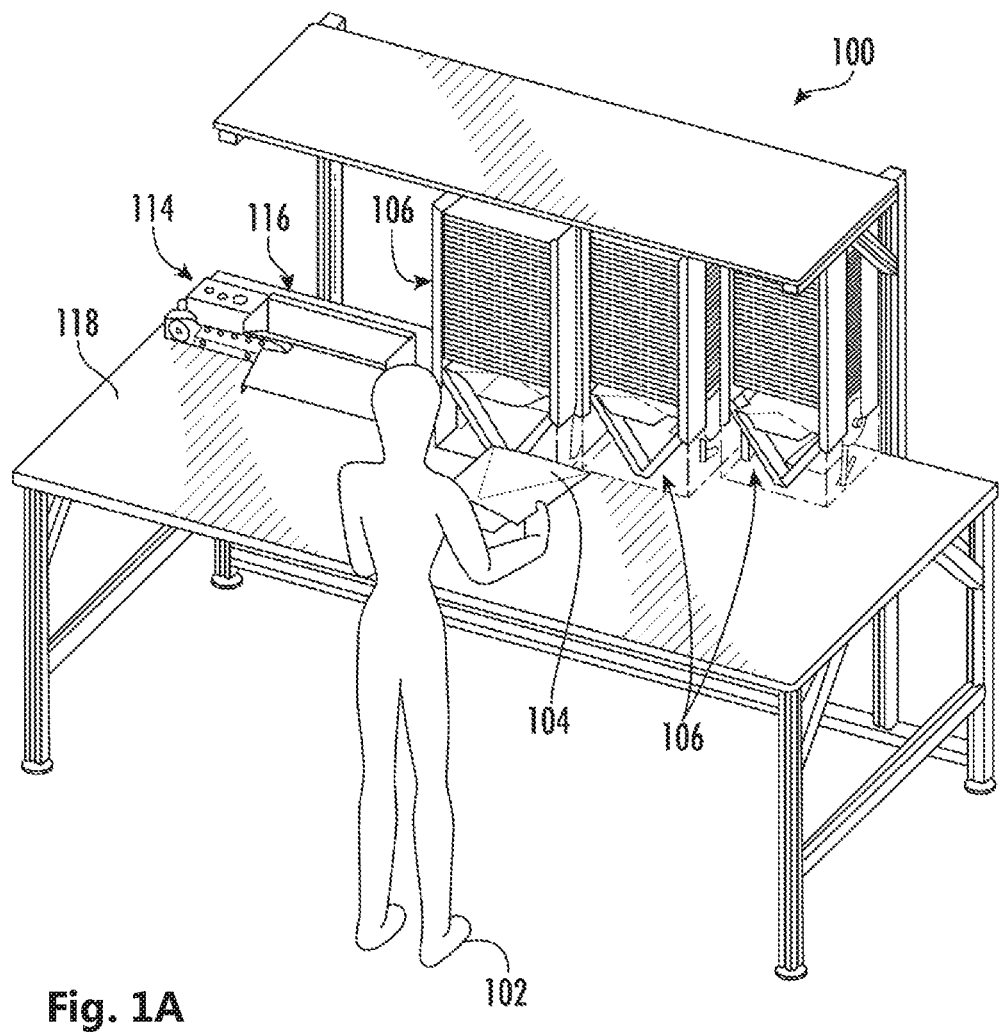
FIG. 1A depicts a packaging station at which a user can fill and close a cushioned mailer that does not have a closure flap, adhesive, or a release liner, in accordance with the embodiments disclosed herein.

Depicted in FIG. 1A is a packaging station 100 at which a user 102 can fill and close a cushioned mailer 104 that does not have a closure flap, adhesive, or a release liner. In the depicted embodiment, the user 102 selected the cushioned mailer 104 from one of a number of supplies 106 of cushioned mailers. In the depicted embodiment, each of the supplies 106 contains cushioned mailers that have a different size (e.g., a different width and/or a different length) than the other of the supplies 106 of cushioned mailers. In some cases, the user 102 may have selected the cushioned mailer 104 from one of the supplies 106 based on a size of an object to be inserted into the cushioned mailer 104.

Figure 1B:
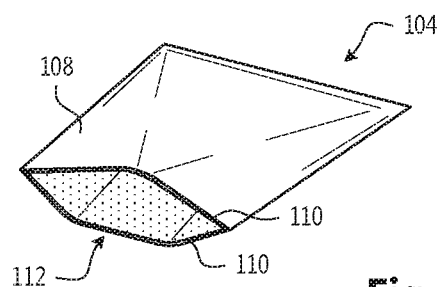
FIG. 1B depicts an embodiment of a cushioned mailer, in accordance with the embodiments disclosed herein.

The cushioned mailer 104 is depicted in greater detail in FIG. 1B. The cushioned mailer 104 includes an outer material 108. In some embodiments, the outer material 108 includes one or more of Kraft paper, cardstock, polyethylene-coated paper, other paper-based materials, polyethylene film, other plastic-based films, or other any other resilient material. The cushioned mailer 104 also includes a cushioning material 110. In some embodiments, the cushioning material 110 includes one or more of air cellular material (e.g., BUBBLE WRAP™ air cellular material sold by Sealed Air Corporation), foam sheets, or any other cushioning material. In a particular embodiment, the outer material 108 is Kraft paper, the cushioning material 110 is air cellular material, and the air cellular material is laminated to the Kraft paper.

In some embodiments, when the user 102 removes the cushioned mailer 104 from one of the supplies 106, the cushioned mailer 104 has an opening 112 on one side and the other three sides of the cushioned mailer 104 are closed (e.g., sealed or adhered closed). The opening 112 permits the user 102 to insert one or more objects into the cushioned mailer 104. As can be seen in FIG. 1B, the opening 112 of the cushioned mailer 104 does not include a closure flap. The cushioned mailer 104 also does not include an adhesive strip with a release liner to enable a closure flap to be adhered over the opening 112.

Returning back to the packaging station 100 decided in FIG. 1A, the packaging station 100 includes a fusing device 114 that is capable of selectively applying pressure and heat to the opening 112 of the cushioned mailer 104. In some embodiments, the pressure and heat applied by the fusing device 114 cause portions of the opening 112 to fuse together to close the opening 112 of the cushioned mailer 104. In some embodiments, the fusing device 114 is capable of causing the portions of the opening 112 to fuse together to close the opening 112 as the opening of the cushioning mailer 104 is passes through the fusing device 114 in a sliding direction. Additional embodiments of fusing devices are described below and can be used in the packaging station 100 as the fusing device 114.

One difficulty with the used of the fusing device 114 is that the two sides of the opening 112 need to be constrained together before the opening 112 can be inserted into the fusing device 114. The user 102 is capable of constraining the opening 112 in order to insert the opening 112 into the fusing device 114. However, this operation could be time consuming and require skill and training to use.

In order to quickly and easily constrain the opening 112 of the cushioning mailer 104, the packaging station 100 also includes a forming funnel 116. The forming funnel 116 is configured to receive the opening 112 of the mailer as the user inserts the opening 112 into the forming funnel 116. The forming funnel 116 is also configured to constrain the opening 112 after the opening 112 has been inserted into the forming funnel 116. The forming funnel 116 also has an open end proximate the fusing device 114 that allows the user 102 to slide the cushioning mailer 104 in a sliding direction toward the fusing device 114. The forming funnel 116 is configured to continue constraining the opening 112 of the cushioning miler 104 as the cushioning mailer 104 is slid toward the fusing device 114 in the sliding direction. Additional embodiments of forming funnels are described below and can be used in the packaging station 100 as the forming funnel 116.

In the depicted embodiment, the packaging station 100 includes a working surface 118 that the user 102 can use when packaging objects in cushioning mailers. In the depicted embodiment, the supplies 106 of the cushioning mailers, the fusing device 114, and the forming funnel 116 are all located on the surface 118. This arrangement may be convenient for the user 102 to be able to stage objects for packaging into the cushioning mailers on the surface 118, select a cushioning mailer 104 from one of the supplies 106, insert one or more objects in the selected cushioning mailer 104, insert the opening 112 of the cushioning mailer 104 into the forming funnel 116, slide the opening 112 of the cushioning mailer 104 through the forming funnel 116 and the fusing device 114. As the opening 112 of the cushioning mailer 104 passes through the fusing device 114, the fusing device 114 causes portions of the opening 112 to fuse together to close the opening 112 of the cushioned mailer 104. In this way, the fusing device 114 and the forming funnel 116 assist in the manual closing of the opening 112 of the cushioning mailer 104.

Figure 2:
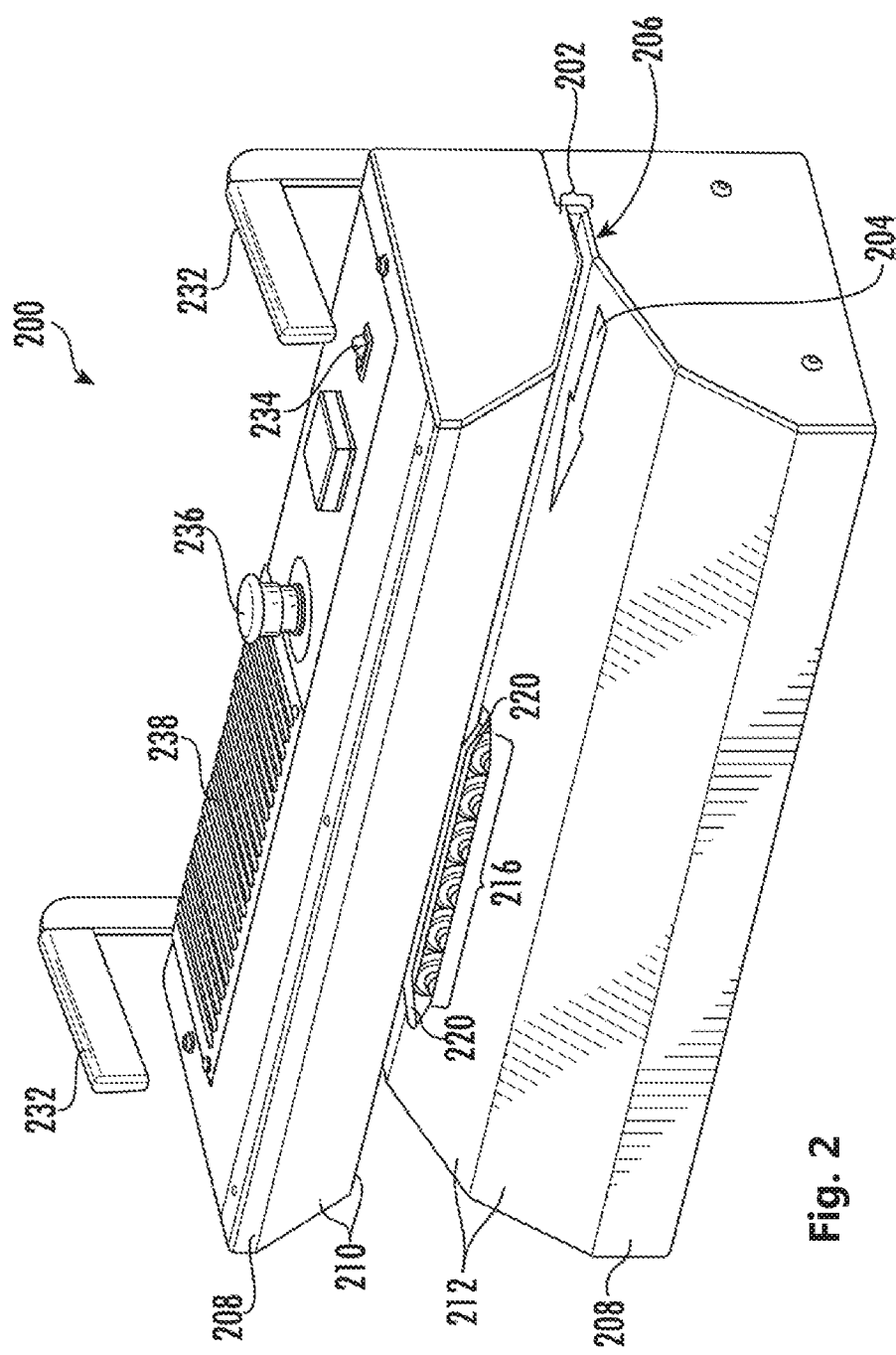
FIG. 2 depicts an embodiment of a fusing device that can be used in place of the fusing device shown in the packaging station in FIG. 1A, in accordance with the embodiments disclosed herein.
Figure 3B:
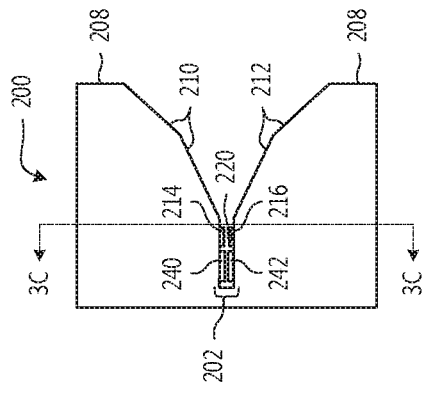
FIGS. 3A, 3B, and 3C depict front, side, and cross-sectional front views, respectively, showing portions of the fusing device depicted in FIG. 2, in accordance with the embodiments disclosed herein.

Depicted in FIG. 2 is an embodiment of a fusing device 200 that can be used in place of the fusing device 114 in the packaging station 100. Portions of the fusing device 200 are also depicted in front, side, and cross-sectional front views shown, respectively, in FIGS. 3A, 3B, and 3C. The fusing device 200 includes a slot 202 through which the opening of a cushioning mailer can be slid in a sliding direction 204. The slot 202 is arranged so that the opening of the cushioning mailer is constrained when it is in the slot. As used herein when referring to the openings of cushioned mailers, the term "constrained" includes a condition where at least one of the two sides of the opening is deflected from a position that is different from its natural resting position. In one example, when an opening of a cushioned mailer is constrained in the slot 202, the slot 202 deflects one or both sides of the opening to be closer together than they would be if the sides were in their natural resting position. The slot 202 is capable of receiving the opening of the cushioned mailer through an inlet 206 as the mailer is slid in the sliding direction 204.

In the depicted embodiment, the slot 202 is recessed back from front surfaces 208 of the fusing device 200. Between the slot 202 and the front surfaces 208, the fusing device 200 includes an upper divergent surface 210 and a lower divergent surface 212. In the depicted embodiment, each of the upper and lower divergent surfaces 210 and 212 includes two distinct planar surfaces. Each of the surfaces depicted in the upper and lower divergent surfaces 210 and 212 is not parallel to the horizontal surfaces of the slot, not parallel to the front surfaces 208 and not parallel to the other surfaces of the upper and lower divergent surfaces 210 and 212. In other embodiments, each of the upper and lower divergent surfaces 210 and 212 may include a single planar surface, any other number of planar surfaces, a contoured surface, any other surface, or any combination thereof. The upper and lower divergent surfaces 210 and 212 allow the slot 202 to be relatively narrow to constrain the sides of the opening together while other portions of the mailer may be thicker than the slot 202 (e.g., the portion of the mailer that is thicker because an object has been inserted into the mailer).

The fusing device 200 is configured to apply pressure to an exterior of the opening of the mailer as the opening of the mailer is moved through the slot 202 in the sliding direction 204. In the depicted embodiment, the fusing device 200 includes an upper set of rollers 214 that extend into the slot 202. The upper set of rollers 214 is arranged to contact a top side of the exterior of the opening of the mailer as the opening is moved through the slot 202. The fusing device 200 also includes a lower set of rollers 216 that extend into the slot 202. The lower set of rollers 216 is arranged to contact a bottom side of the exterior of the opening of the mailer as the opening is moved through the slot 202. The top and bottom sets of rollers 214 and 216 pinch the opening of the mailer by exerting a pressure on the exterior of both sides of the opening of the mailer. In some embodiments, the respective locations of the top and bottom sets of rollers 214 and 216 may be selected based on one or more of an amount of pressure to be applied to the opening of the mailer, any other operating condition of the fusing device 200, an expected width of the mailer, any other characteristic of the mailer, or any combination thereof. In the depicted embodiment, portions of the top and bottom sets of rollers 214 and 216 extend into the slot 202 to apply pressure to and further constrain the opening of the mailer.

In the depicted embodiment, the fusing device 200 also includes nip rollers that are configured to apply pressure to an exterior of the opening of the mailer. More particularly, the fusing device 200 includes an upstream upper nip roller $240_1$ and an upstream lower nip roller $242_1$ that form an upstream set of nip rollers and the fusing device 200 includes a downstream upper nip roller $240_2$ and a downstream lower nip roller $242_2$ that form a downstream set of nip rollers. In the depicted embodiment, the upstream upper and lower nip rollers $240_1$ and $242_1$ are located upstream of heating elements (e.g., heating elements 228 and 230, which are discussed in greater detail below) and the downstream upper and lower nip rollers $240_2$ and $242_2$ are located downstream of the heating elements (e.g., heating elements 228 and 230). In some embodiments, the upstream upper and lower nip rollers $240_1$ and $242_1$ are configured to constrain the opening of the mailer before the mailer reaches the heating elements. In the case where the mailer is a cushioned mailer that has air cellular cushioning material, the upstream upper and lower nip rollers $240_1$ and $242_1$ may be configured to apply sufficient pressure to rupture inflated cells of the air cellular material in the opening of the mailer. In some embodiments, the downstream upper and lower nip rollers $240_2$ and $242_2$ are configured to apply pressure to the opening of the mailer after the opening of the mailer has been heated by the heating elements. In the case where the mailer is a cushioned mailer that has ruptured air cellular cushioning material at the opening, the heat from the heating elements may have melted and/or softened the ruptured air cellular cushioning material and the pressure from the downstream upper and lower nip rollers $240_2$ and $242_2$ may cause the melted and/or softened ruptured air cellular cushioning material to solidify together to form a seal.

In the depicted embodiment, the fusing device 200 also includes a conveying system 218. The conveying system 218 is arranged to convey the opening of the mailer through at least the portion of the slot 202 that includes the top and bottom sets of rollers 214 and 216. In the depicted embodiment, the conveying system 218 includes a continuous band 220 that passes along the lower set of rollers 216. The continuous band 220 also passes along guide rollers 222. In the depicted embodiment, the conveying system 218 includes a driving mechanism 224 (e.g., an electric motor) configured to selectively drive one of the guide rollers 222. The driving of the one of the guide rollers 222 by the driving mechanism 224 may cause rotation of the one of the guide rollers 222 and corresponding rotation of the continuous band 220. In some cases, the operation of the driving mechanism 224 is controlled by a controller (not shown) to control movement of the continuous band 220. In some embodiments, when a user brings the opening of the mailer into contact with the continuous band 220 of the conveying system 218, the continuous band 220 will convey the opening of the mailer through the portion of the slot 202 that includes the top and bottom sets of rollers 214 and 216.

Figure 3D:
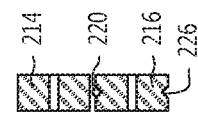
FIG. 3D depicts a cross-sectional view of a continuous band and one of the rollers from each of a top and bottom sets of rollers in the fusing device depicted in FIG. 2, in accordance with the embodiments disclosed herein.
Figure 3A:
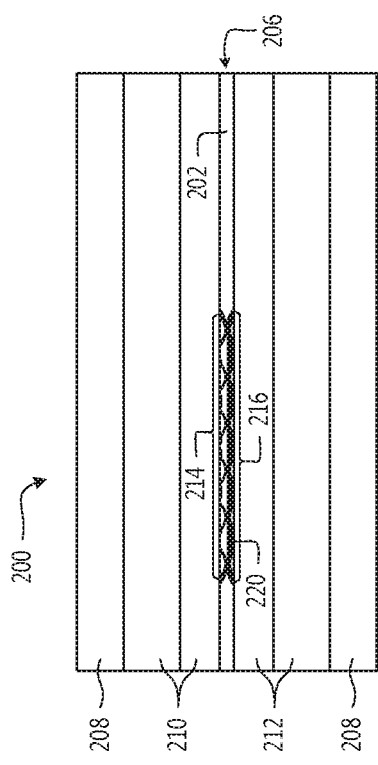
Figure 3C:
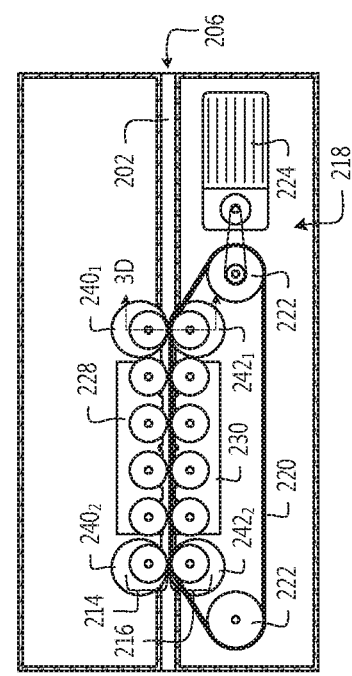

A cross-sectional view of the continuous band and one of the rollers from each of the top and bottom sets of rollers 214 and 216 is shown in FIG. 3D. As can be seen in FIG. 3D, the depicted embodiment of the continuous band 220 has a circular cross section. In other embodiments, the continuous band 220 can have a rectangular cross section, a triangular cross-section, or any other shape cross section. In the depicted embodiment, the rollers in the bottom set of rollers 216 have a groove 226 in which the continuous band 220 is located. The groove 226 may aid in alignment of the continuous band 220 with respect to the rollers in the bottom set of rollers 216. In the depicted embodiment, the groove 226 has a V-shaped cross section. In other embodiments, the groove 226 may have a rectangular cross section, a semi-circular cross section, or any other shape cross section. In some embodiments, the continuous band 220 is made from an elastomeric material, such as an elastic polymer material or a rubber material.

The fusing device 200 is also configured to apply heat to the opening of the mailer as the opening of the mailer is moved through the slot 202 in the sliding direction 204. In the depicted embodiment, the fusing device 200 includes an upper heating element 228 and a lower heating element 230. The upper heating element 228 is configured to directed heat downward toward the slot 202 and the lower heating element 230 is configured to direct heat upward toward the slot 202. In other embodiments, the fusing device 200 may include only one of the upper and lower heating elements 228 and 230. In some embodiments, the upper and lower heating elements 228 and 230 may be controlled based on a sensed temperature. For example, the fusing device 200 may include a temperature sensor, such as a thermocouple, a thermistor, or any other temperature sensor. The temperature sensor may detect a temperature of the fusing device 200, such as a temperature in the slot 202 near one of the top and bottom sets of rollers 214 and 216. A controller (not shown) may be configured to receive signals indicative of the temperature from the temperature sensor and control operation of the upper and lower heating elements 228 and 230 based on the signals received from the temperature sensor. In some examples, the controller can control the upper and lower heating elements 228 and 230 so that the measured temperature is at a target temperature (e.g., at 200° C., at 240° C., etc.), within a range of temperatures around a target temperature (e.g., a range of ±5° C. of 200° C., a range of ±10° C. of 240° C., etc.), or within a range of temperature (e.g., between about 200° C. and about 240° C.). In some embodiments, the upper and lower heating elements 228 and 230 include electrically-resistive heating wires that generate heat in response to electrical current passing through the heating wires. In some embodiments, the upper and lower heating elements 228 and 230 include fans or other blowing devices configured to direct a gas (e.g., air) over the heating wires and toward the slot 202.

Figure 3E:
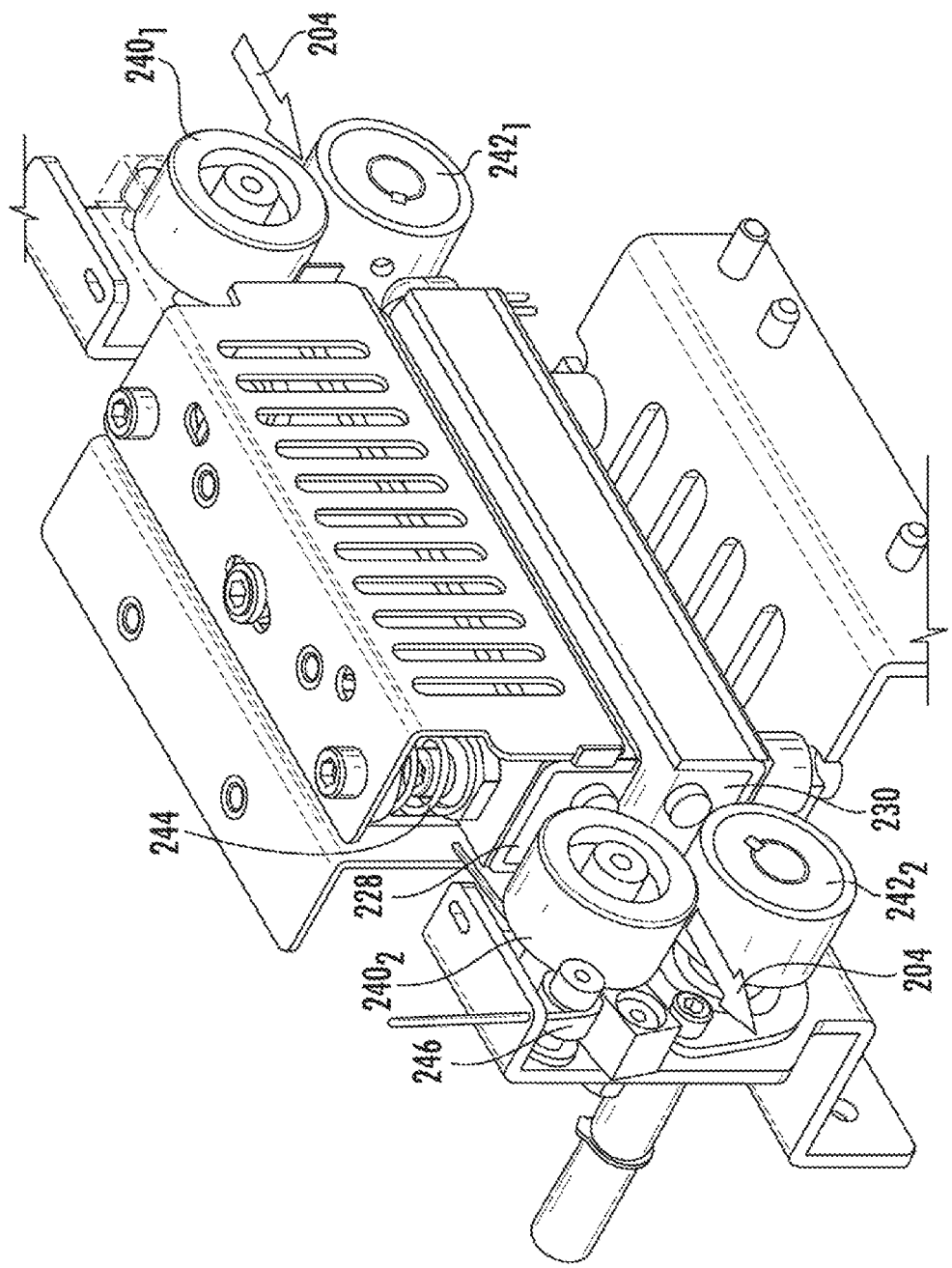
FIG. 3E depicts a perspective view of a portion of the depicted in FIG. 2 that includes upper and lower heating elements, upstream upper and lower nip rollers, and downstream upper and lower nip rollers, in accordance with the embodiments disclosed herein.

Depicted in FIG. 3E is a perspective view of a portion of the fusing device 200 that includes the upper and lower heating elements 228 and 230, the upstream upper and lower nip rollers $240_1$ and $242_1$, and the downstream upper and lower nip rollers $240_2$ and $242_2$. In the depicted embodiment, the upstream and downstream upper nip rollers $240_1$ and $240_2$ are knurled metal (e.g., steel) rollers and the upstream and downstream upper nip rollers $242_1$ and $242_2$ are elastomer-coated (e.g., silicone- and/or rubber-coated) rollers. In the depicted embodiment, the upstream and downstream lower nip rollers $242_1$ and $242_2$ are configured to be driven by a driving mechanism (e.g., an electric motor) and the upstream and downstream upper nip rollers $240_1$ and $240_2$ are configured to be idler rollers. As a mailer is moved downstream in the sliding direction 204, the opening of the mailer will pass between the upstream upper and lower nip rollers $240_1$ and $242_1$, pass between the upper and lower heating elements 228 and 230, and pass between the downstream upper and lower nip rollers $240_2$ and $242_2$. The movement of the mailer in the sliding direction 204 can be aided by driving the upstream and downstream lower nip rollers $242_1$ and $242_2$.

In the depicted embodiment, the locations of the upstream upper and lower nip rollers $240_1$ and $242_1$ are fixed with respect to each other. In the case that the mailer includes air cellular cushioning material, the distance between the upstream upper and lower nip rollers $240_1$ and $242_1$ may be selected to increase the likelihood that the air cellular cushioning material in the opening of the mailer will be ruptured by the pressure applied by the upstream upper and lower nip rollers $240_1$ and $242_1$. In the depicted embodiment, the lower heating element 230 is in a fixed position and the upper heating element 228 is biased toward the lower heating element 230 by a biasing mechanism 244 (e.g, a compression spring). The biasing of the upper heating element 228 may ensure that the upper and lower heating elements 228 and 230 are as close to each other as the opening of the mailer will allow while the opening of the mailer passes between the upper and lower heating elements 228 and 230. In the depicted embodiment, the downstream lower nip roller $242_2$ is in a fixed position and the downstream upper nip roller $240_2$ is biased toward the downstream lower nip roller $242_2$ by a biasing mechanism 246 (e.g, a torsional spring). The biasing of the downstream upper nip roller $240_2$ may ensure that the downstream upper and lower nip rollers $240_2$ and $242_2$ are as close to each other as the opening of the mailer will allow while the opening of the mailer passes between the downstream upper and lower nip rollers $240_2$ and $242_2$. In the case where the downstream upper and lower nip rollers $240_2$ and $242_2$ cause melted and/or softened ruptured air cellular cushioning material to solidify together to form a seal, the biasing of the downstream upper nip roller $240_2$ may increase the likelihood that a proper seal is formed.

In the embodiment shown in FIG. 2, the fusing device 200 also includes components that aid a user to use the fusing device 200. The fusing device 200 includes handles 232 that a user can grasp to lift or move to the fusing device 200. The fusing device includes a power switch 234 that can be switched by a user to toggle the fusing device 200 between a powered-on condition and a powered-off condition. The fusing device 200 also includes a stop button 236. The stop button 236 can be pressed to shut off power to the fusing device 200, which may be used in the case of emergency or any other exigent situation. The fusing device 200 also includes a vent 238 that permits gas (e.g., air) to pass from an interior of the fusing device 200 to an exterior of the fusing device 200. The venting may reduce the possibility of an overheating condition within the interior of the fusing device 200.

As the opening of a mailer passes through the slot, the fusing device 200 causes portions of the opening to fuse together to close the mailer. In a non-limiting example, both sides of the cushioned mailer have a Kraft paper exterior that is laminated to an air cellular material that is made from a polyethylene-based film. As the opening of the mailer is passed through the slot 202 of the fusing device 200, the fusing device 200 applies pressure to the exterior of the opening of the cushioned mailer (e.g., pressure due to the position of the top and bottom sets of rollers 214) and the fusing device 200 applied heat to the opening of the cushioned mailer. The pressure and heat applied by the fusing device 200 cause the air cellular material to soften or melt and the air cellular material from the two sides of the opening to fuse together. This function forms a heat seal that fuses the two sides of the opening together. The fused portions may completely close the opening of the mailer (e.g., the heat seal extends across the entire opening) or partially close the opening (e.g., the heat seal extends across portions of the opening without extended completely across the opening). In this way, the fusing device 200 causes portions of the opening to fuse together to either partially or fully close the mailer.

One difficulty with the use of the fusing device 200 alone is that it can be difficult to insert the opening of the slot 202. Because the slot 202 is configured to constrain the opening of the mailer from its natural resting state, the opening of the mailer needs to be constrained to fit within the slot 202. When using the fusing device 200 alone, a user would need to manually constrain the opening of the mailer in order to insert the opening of the mailer into the slot 202. In some cases, this may require the user to constrain the opening of the mailer using two hands. In addition, this manual constraining takes additional time beyond the time to merely slide the opening of the mailer through the slot 202. It would be beneficial to have another way to constrain the opening of the mailer before inserting the opening of the mailer into the slot 202.

Figure 4:
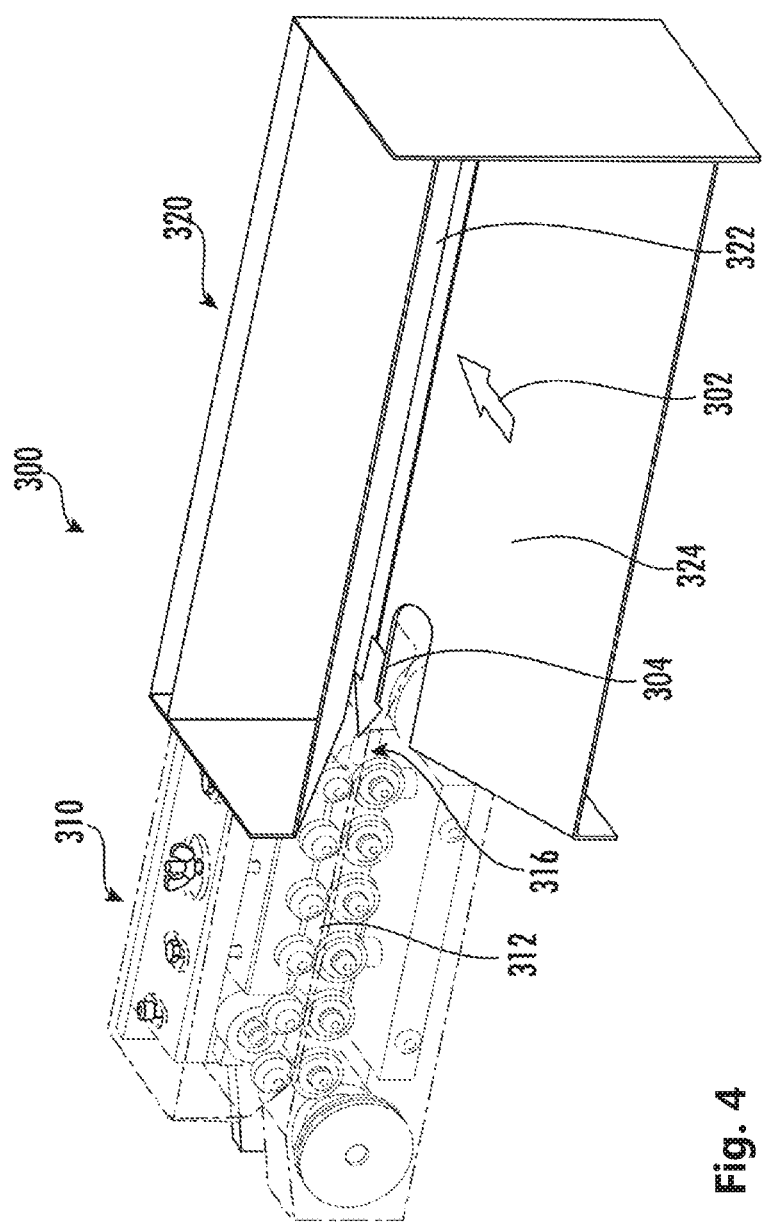
FIG. 4 depicts an embodiment of a system that includes a fusing device and a forming funnel, in accordance with the embodiments described herein.

Depicted in FIG. 4 is an embodiment of a system 300 that includes a fusing device 310 and a forming funnel 320 that is capable of constraining the opening of a mailer before the opening of the mailer is introduced into the fusing device 310. The fusing device 310 includes a slot 312 and an inlet 316 into the slot. The forming funnel 320 includes an upper funneling surface 322 and a lower funneling surface 324. The upper and lower funneling surfaces 322 and 324 are configured so that the mailer can be inserted into the forming funnel 320 in an insertion direction 302. As the mailer is inserted into the forming funnel 320 in the insertion direction 302, the opening of the mailer is oriented toward the forming funnel 320 and at least one side of the opening of the mailer contacts at least one of the upper and lower funneling surfaces 322 and 324 to constrain the opening.

When the mailer is fully inserted into the forming funnel 320, the forming funnel 320 constrains the opening of the mailer. From this position, the mailer can be slid in a sliding direction 304 through the forming funnel 320 while the forming funnel continues to constrain the opening of the mailer. The mailer can be further slid in the sliding direction 304 out of the forming funnel 320 and into the fusing device 310 through the inlet 316 into the slot 312. In the depicted embodiment, the constrained opening of the mailer is able to slide into the slot 312 of the fusing device 310 without any additional manipulation by the user. The mailer can then be moved further through the slot 312 while the opening of the mailer is constrained by the slot 312. As the opening of the mailer is moved through the slot 312 in the sliding direction 304, the fusing device 310 is configured to apply pressure and heat to cause portions of the opening to fuse together to close the mailer.

In the depicted embodiment, the fusing device 310 and the forming funnel 320 are separate devices. The fusing device 310 and the forming funnel 320 have been located with respect to each other so that a constrained opening of a mailer sliding out of the forming funnel 320 will enter through the inlet 316 and into the slot 312. In other embodiments, the fusing device 310 and the forming funnel 320 may be selectively couplable to each other. Selectively couplable items can be coupled to each other and decoupled from each other without the use of tools. In other embodiments, the fusing device 310 and the forming funnel 320 may be fixedly coupled to each other. Selectively couplable items are coupled to each other in such a way that they can only be decoupled from each other with the use of tools. In other embodiments, the fusing device 310 and the forming funnel 320 may be integrally formed together as a single device.

Figure 5A:
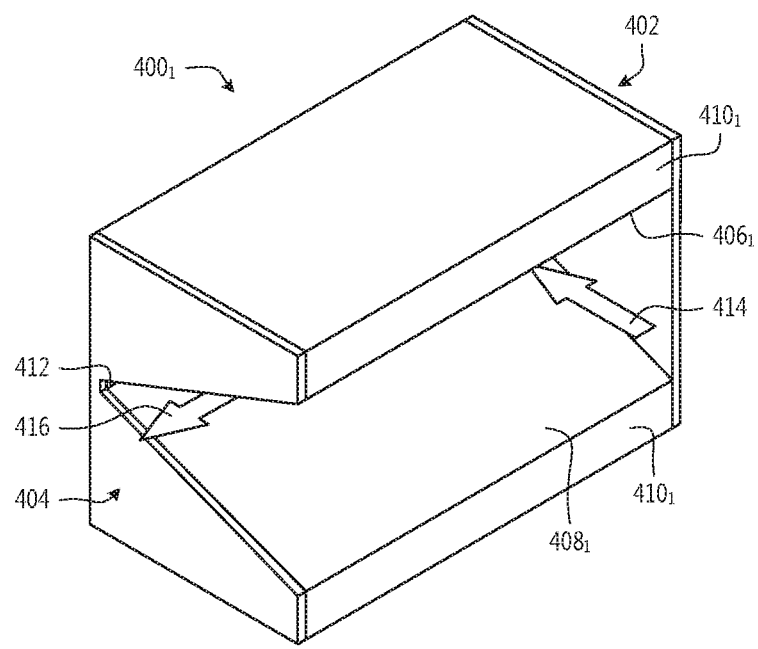
FIGS. 5A, 5B, and 5C depict perspective, front, and side views, respectively, of a first embodiment of a forming funnel, in accordance with the embodiments described herein.
Figure 5B:
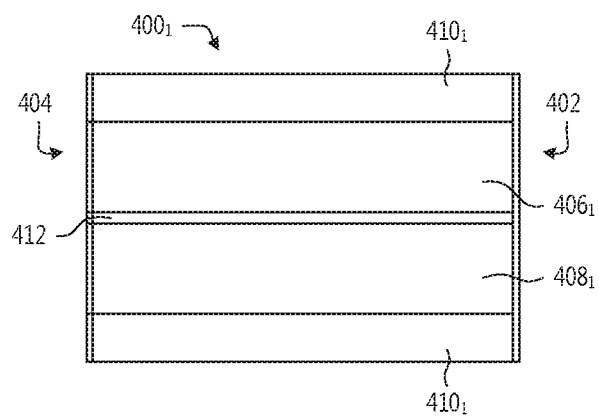
Figure 5C:
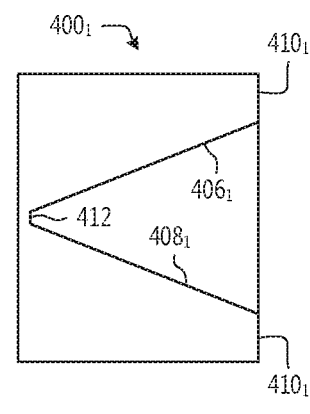

Depicted in FIGS. 5A, 5B, and 5C are perspective, front, and side views, respectively, of an embodiment of a forming funnel $400_1$ that can be used in place of any of the other forming funnels described herein. The forming funnel $400_1$ includes a closed end 402 and an open end 404. The forming funnel $400_1$ also includes an upper funneling surface $406_1$ and a lower funneling surface $408_1$. Each of the upper and lower funneling surfaces $406_1$ and $408_1$ extends between the closed end 402 and the open end 404. The closed end 402 is closed between the upper and lower funneling surfaces $406_1$ and $408_1$ so that an object (e.g., a mailer) located between the upper and lower funneling surfaces $406_1$ and $408_1$ cannot be slid out of the forming funnel $400_1$ through the closed end 402. The open end is open between the upper and lower funneling surfaces $406_1$ and $408_1$ so that an object (e.g., a mailer) located between the upper and lower funneling surfaces $406_1$ and $408_1$ can be slid out of the forming funnel $400_1$ through the open end 404.

In the depicted embodiment, each of the upper and lower funneling surfaces $406_1$ and $408_1$ has a substantially constant cross section between the closed end 402 and the open end 404. The upper and lower funneling surfaces $406_1$ and $408_1$ extend between front surfaces $410_1$ and a distal surface 412 of the forming funnel $400_1$. In the depicted embedment, each of the upper and lower funneling surfaces $406_1$ and $408_1$ is a single, substantially planar surface. The upper and lower funneling surfaces $406_1$ and $408_1$ are not parallel to each other so that the upper and lower funneling surfaces $406_1$ and $408_1$ are further apart at the front surfaces $410_1$ than they are apart at the distal surface 412. In this way, the upper and lower funneling surfaces $406_1$ and $408_1$ are configured to receive an opening of a mailer as the mailer is inserted in an insertion direction 414. With the opening oriented toward the distal surface 412, the mailer can be inserted in the insertion direction 414 until the opening reaches the distal surface 412. During the insertion, top and bottom sides of the opening of the mailer contact the upper and lower funneling surfaces $406_1$ and $408_1$, respectively, to constrain the opening. After the mailer is inserted (e.g., after the opening of the mailer reaches the distal surface 412), the mailer can be moved in a sliding direction 416 and the upper and lower funneling surfaces $406_1$ and $408_1$ continue to constrain the opening of the mailer.

Dimensions and characteristics of the forming funnel $400_1$ may be selected based on a desired performance of the forming funnel $400_1$. In one example, the angle between the upper and lower funneling surfaces $406_1$ and $408_1$ may be selected based on a desired constraining of the opening of the mailer by the upper and lower funneling surfaces $406_1$ and $408_1$. In another example, a vertical distance between the ends of the upper and lower funneling surfaces $406_1$ and $408_1$ at the front surfaces $410_1$ and/or a vertical distance between the ends of the upper and lower funneling surfaces $406_1$ and $408_1$ at the distal surface 412 and may selected based on a desired constraining of the opening of the mailer by the upper and lower funneling surfaces $406_1$ and $408_1$. In another example, the horizontal width between the distal surface 412 and the front surfaces $410_1$ may be selected based on a desired insertion distance of the opening of the mailer. In another example, a material of the upper and lower funneling surfaces $406_1$ and $408_1$ and/or a coating on the upper and lower funneling surfaces $406_1$ and $408_1$ may be selected to provide a desired low level of friction between the e upper and lower funneling surfaces $406_1$ and $408_1$ and the opening of the mailer.

Figure 6A:
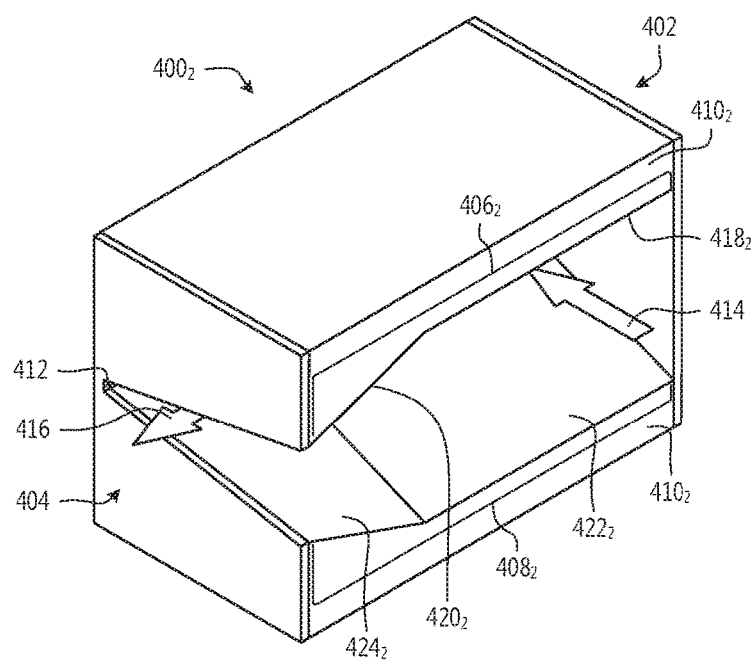
FIGS. 6A, 6B, and 6C depict perspective, front, and side views, respectively, of a second embodiment of a forming funnel, in accordance with the embodiments described herein.
Figure 6B:
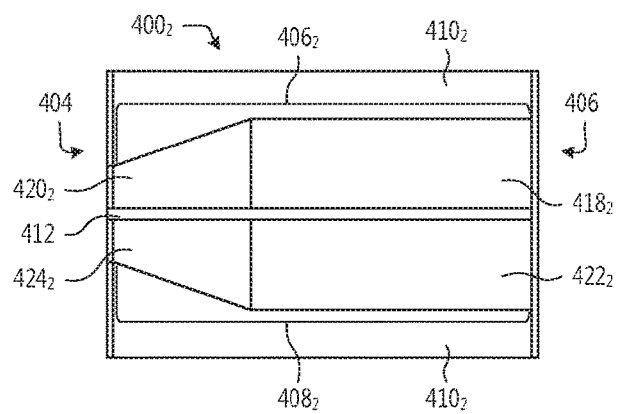
Figure 6C:
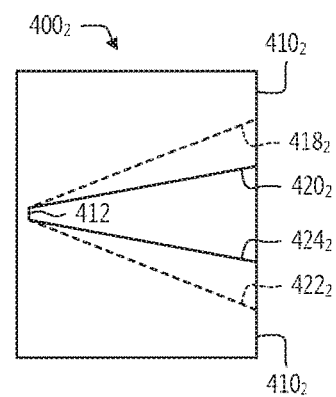

Depicted in FIGS. 6A, 6B, and 6C are perspective, front, and side views, respectively, of an embodiment of a forming funnel $400_2$ that can be used in place of any of the other forming funnels described herein. The forming funnel $400_2$ includes some similar components to those of the forming funnel $400_1$, including those components that are numbered with the same reference numbers. Those similar components include the closed end 402, the open end 404, the distal surface 412, the insertion direction 414, and the sliding direction 416. The forming funnel $400_2$ also includes an upper funneling surface $406_2$ and a lower funneling surface $408_2$. The forming funnel $400_2$ also includes front surfaces $410_2$.

The upper funneling surface $406_2$ includes a first portion $418_2$ and a second portion $420_2$. The first portion $418_2$ of the upper funneling surface $406_2$ has a substantially constant cross section and extends from the closed end 402 to the second portion $420_2$. The second portion $420_2$ of the upper funneling surface $406_2$ has a non-constant cross section and extends from the first portion $418_2$ to the open end 404. The lower funneling surface $408_2$ includes a first portion $422_2$ and a second portion $424_2$. The first portion $422_2$ of the lower funneling surface $408_2$ has a substantially constant cross section and extends from the closed end 402 to the second portion $424_2$. The second portion $424_2$ of the lower funneling surface $408_2$ has a non-constant cross section and extends from the first portion $422_2$ to the open end 404. As can be seen in FIG. 6C, the average distance between the second portion $420_2$ of the upper funneling surface $406_2$ and the second portion $424_2$ of the lower funneling surface $408_2$ at the open end 404 is less than the average distance between the first portion $418_2$ of the upper funneling surface $406_2$ and the first portion $422_2$ of the lower funneling surface $408_2$ at the closed end 402.

In the depicted embodiment, none of the first and second portions $418_2$ and $420_2$ of the upper funneling surface $406_2$ and the first and second portions $422_2$ and $424_2$ of the lower funneling surface $408_2$ are not parallel to each other so that the upper and lower funneling surfaces $406_2$ and $408_2$ are further apart at the front surfaces $410_2$ than they are apart at the distal surface 412. In this way, the upper and lower funneling surfaces $406_2$ and $408_2$ are configured to receive an opening of a mailer as the mailer is inserted in an insertion direction 414. In some cases, the opening of the mailer is inserted between the first portion $418_2$ of the upper funneling surface $406_2$ and the first portion $422_2$ of the lower funneling surface $408_2$ in the insertion direction 414. With the opening oriented toward the distal surface 412, the mailer can be inserted in the insertion direction 414 until the opening reaches the distal surface 412. During the insertion, top and bottom sides of the opening of the mailer contact the upper and lower funneling surfaces $406_2$ and $408_2$, respectively, to constrain the opening. After the mailer is inserted (e.g., after the opening of the mailer reaches the distal surface 412), the mailer can be moved in a sliding direction 416 and the upper and lower funneling surfaces $406_2$ and $408_2$ continue to constrain the opening of the mailer. In some cases, as the opening of the mailer is moved from between the first portion $418_2$ of the upper funneling surface $406_2$ and the first portion $422_2$ of the lower funneling surface $408_2$ to the open end 404 in the sliding direction 416, the second portion $420_2$ of the upper funneling surface $406_2$ and the second portion $424_2$ of the lower funneling surface $408_2$ further constrains the opening of the mailer.

Dimensions and characteristics of the forming funnel $400_2$ may be selected based on a desired performance of the forming funnel $400_2$. In one example, the angle between the first portions $418_2$ and $422_2$ of the upper and lower funneling surfaces $406_2$ and $408_2$ may be selected based on a desired constraining of the opening of the mailer as the opening of the mailer is moved in the insertion direction 414. In another example, a vertical distance between the ends of the first portions $418_2$ and $422_2$ of the upper and lower funneling surfaces $406_2$ and $408_2$ at the front surfaces $410_2$ and/or a vertical distance between the ends of the upper and lower funneling surfaces $406_2$ and $408_2$ at the distal surface 412 and may selected based on a desired constraining of the opening of the mailer by the upper and lower funneling surfaces $406_2$ and $408_2$. In another example, the angle between the second portions $420_2$ and $424_2$ of the upper and lower funneling surfaces $406_2$ and $408_2$ may be selected based on a desired further constraining of the opening of the mailer as the opening of the mailer is moved in the sliding direction 416.

Figure 7A:
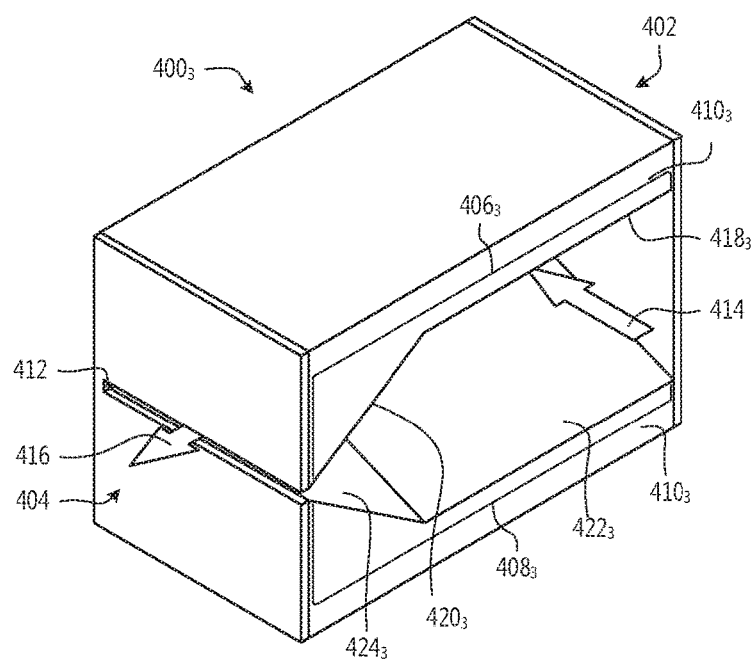
FIGS. 7A, 7B, and 7C depict perspective, front, and side views, respectively, of a third embodiment of a forming funnel, in accordance with the embodiments described herein.
Figure 7B:
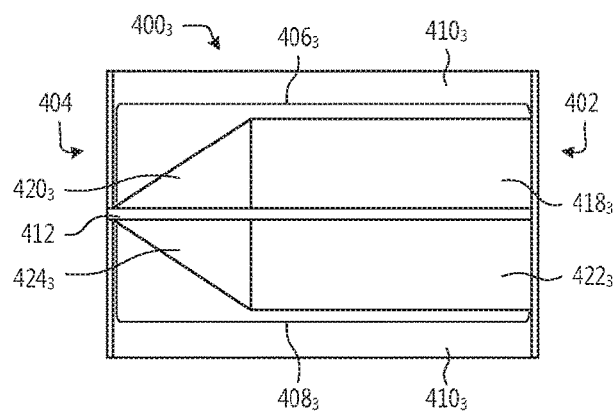
Figure 7C:
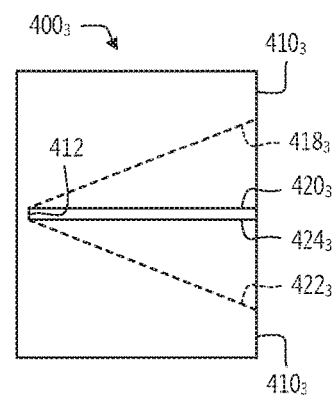

Depicted in FIGS. 7A, 7B, and 7C are perspective, front, and side views, respectively, of an embodiment of a forming funnel $400_3$ that can be used in place of any of the other forming funnels described herein. The forming funnel $400_3$ includes some similar components to those of the forming funnel $400_1$, including those components that are numbered with the same reference numbers. Those similar components include the closed end 402, the open end 404, the distal surface 412, the insertion direction 414, and the sliding direction 416. The forming funnel $400_3$ also includes an upper funneling surface $406_3$ and a lower funneling surface $408_3$. The forming funnel $400_3$ also includes front surfaces $410_3$.

The upper funneling surface $406_3$ includes a first portion $418_3$ and a second portion $420_3$. The first portion $418_3$ of the upper funneling surface $406_3$ has a substantially constant cross section and extends from the closed end 402 to the second portion $420_3$. The second portion $420_3$ of the upper funneling surface $406_3$ has a non-constant cross section and extends from the first portion $418_3$ to the open end 404. The lower funneling surface $408_3$ includes a first portion $422_3$ and a second portion $424_3$. The first portion $422_3$ of the lower funneling surface $408_3$ has a substantially constant cross section and extends from the closed end 402 to the second portion $424_3$. The second portion $424_3$ of the lower funneling surface $408_3$ has a non-constant cross section and extends from the first portion $422_3$ to the open end 404. As can be seen in FIG. 7C, the average distance between the second portion $420_3$ of the upper funneling surface $406_3$ and the second portion $424_3$ of the lower funneling surface $408_3$ at the open end 404 is less than the average distance between the first portion $418_3$ of the upper funneling surface $406_3$ and the first portion $422_3$ of the lower funneling surface $408_2$ at the closed end 402.

In the depicted embodiment, none of the first and second portions $418_3$ and $420_3$ of the upper funneling surface $406_3$ and the first and second portions $422_3$ and $424_3$ of the lower funneling surface $408_3$ are not parallel to each other so that the upper and lower funneling surfaces $406_3$ and $408_3$ are further apart at the front surfaces $410_3$ than they are apart at the distal surface 412. In this way, the upper and lower funneling surfaces $406_3$ and $408_3$ are configured to receive an opening of a mailer as the mailer is inserted in an insertion direction 414. In some cases, the opening of the mailer is inserted between the first portion $418_3$ of the upper funneling surface $406_3$ and the first portion $422_3$ of the lower funneling surface $408_3$ in the insertion direction 414. With the opening oriented toward the distal surface 412, the mailer can be inserted in the insertion direction 414 until the opening reaches the distal surface 412. During the insertion, top and bottom sides of the opening of the mailer contact the upper and lower funneling surfaces $406_3$ and $408_3$, respectively, to constrain the opening. After the mailer is inserted (e.g., after the opening of the mailer reaches the distal surface 412), the mailer can be moved in a sliding direction 416 and the upper and lower funneling surfaces $406_3$ and $408_3$ continue to constrain the opening of the mailer. In some cases, as the opening of the mailer is moved from between the first portion $418_3$ of the upper funneling surface $406_3$ and the first portion $422_3$ of the lower funneling surface $408_3$ to the open end 404 in the sliding direction 416, the second portion $420_3$ of the upper funneling surface $406_3$ and the second portion $424_3$ of the lower funneling surface $408_3$ further constrains the opening of the mailer.

Dimensions and characteristics of the forming funnel $400_3$ may be selected based on a desired performance of the forming funnel $400_3$. In one example, the angle between the first portions $418_3$ and $422_3$ of the upper and lower funneling surfaces $406_3$ and $408_3$ may be selected based on a desired constraining of the opening of the mailer as the opening of the mailer is moved in the insertion direction 414. In another example, a vertical distance between the ends of the first portions $418_3$ and $422_3$ of the upper and lower funneling surfaces $406_3$ and $408_3$ at the front surfaces $410_3$ and/or a vertical distance between the ends of the upper and lower funneling surfaces $406_3$ and $408_3$ at the distal surface 412 and may selected based on a desired constraining of the opening of the mailer by the upper and lower funneling surfaces $406_3$ and $408_3$. In the depicted example, the ends of the second portions $420_2$ and $424_2$ of the upper and lower funneling surfaces $406_2$ and $408_2$ at the open end 404 are substantially parallel to each other and spaced apart at a distance that is approximately equal to the height of the distal surface 412. In some example, the height of the distal surface 412 is selected based on a desired constraining of the opening of the mailer as the opening of the mailer is moved in the sliding direction 416 out of the open end 404.

Figure 8A:
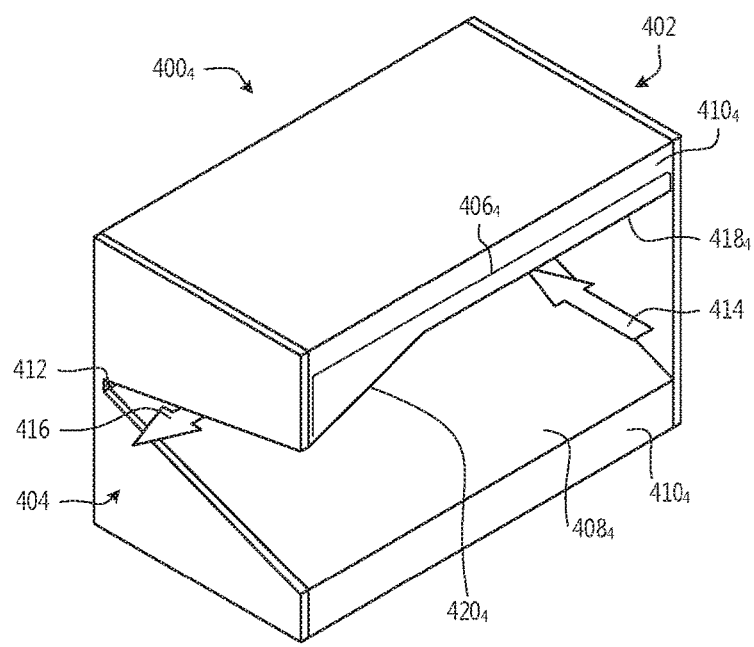
FIGS. 8A, 8B, and 8C depict perspective, front, and side views, respectively, of a fourth embodiment of a forming funnel, in accordance with the embodiments described herein.
Figure 8B:
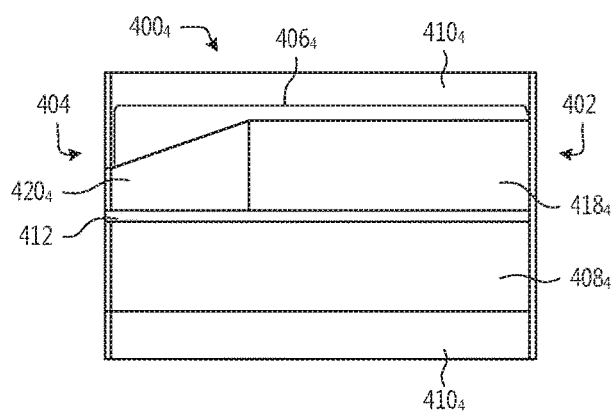
Figure 8C:
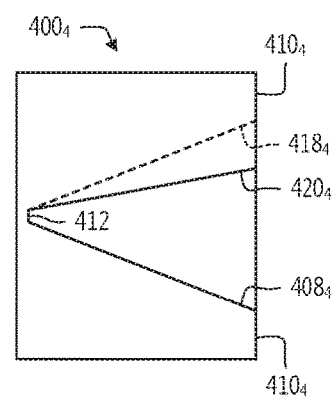

Depicted in FIGS. 8A, 8B, and 8C are perspective, front, and side views, respectively, of an embodiment of a forming funnel $400_4$ that can be used in place of any of the other forming funnels described herein. The forming funnel $400_4$ includes some similar components to those of the forming funnel $400_1$, including those components that are numbered with the same reference numbers. Those similar components include the closed end 402, the open end 404, the distal surface 412, the insertion direction 414, and the sliding direction 416. The forming funnel $400_4$ also includes an upper funneling surface $406_4$ and a lower funneling surface $408_4$. The forming funnel $400_4$ also includes front surfaces $410_4$.

The upper funneling surface $406_4$ includes a first portion $418_4$ and a second portion $420_4$. The first portion $418_4$ of the upper funneling surface $406_4$ has a substantially constant cross section and extends from the closed end 402 to the second portion $420_4$. The second portion $420_4$ of the upper funneling surface $406_4$ has a non-constant cross section and extends from the first portion $418_4$ to the open end 404. The lower funneling surface $408_4$ has a substantially constant cross section and extends from the closed end 402 to the open end 404. As can be seen in FIG. 8C, the average distance between the second portion $420_4$ of the upper funneling surface $406_4$ and the lower funneling surface $408_4$ at the open end 404 is less than the average distance between the first portion $418_4$ of the upper funneling surface $406_4$ and the lower funneling surface $408_4$ at the closed end 402.

In the depicted embodiment, none of the first and second portions $418_4$ and $420_4$ of the upper funneling surface $406_4$ and the lower funneling surface $408_4$ are not parallel to each other so that the upper and lower funneling surfaces $406_2$ and $408_2$ are further apart at the front surfaces $410_4$ than they are apart at the distal surface 412. In this way, the upper and lower funneling surfaces $406_4$ and $408_4$ are configured to receive an opening of a mailer as the mailer is inserted in an insertion direction 414. In some cases, the opening of the mailer is inserted between the first portion $418_4$ of the upper funneling surface $406_4$ and the lower funneling surface $408_4$ in the insertion direction 414. With the opening oriented toward the distal surface 412, the mailer can be inserted in the insertion direction 414 until the opening reaches the distal surface 412. During the insertion, top and bottom sides of the opening of the mailer contact the upper and lower funneling surfaces $406_4$ and $408_4$, respectively, to constrain the opening. After the mailer is inserted (e.g., after the opening of the mailer reaches the distal surface 412), the mailer can be moved in a sliding direction 416 and the upper and lower funneling surfaces $406_4$ and $408_4$ continue to constrain the opening of the mailer. In some cases, as the opening of the mailer is moved from between the first portion $418_4$ of the upper funneling surface $406_4$ to the open end 404 in the sliding direction 416, the second portion $420_4$ of the upper funneling surface $406_4$ further constrains the opening of the mailer.

Figure 9A:
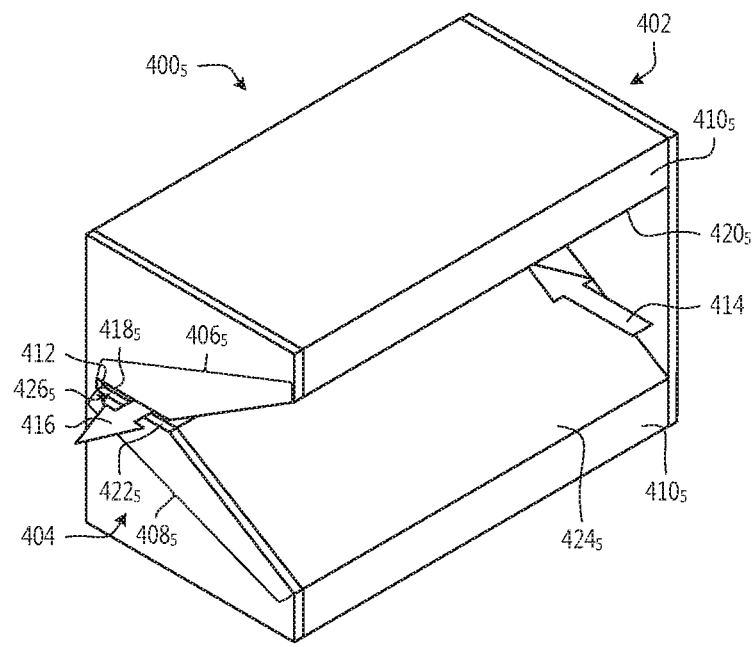
FIGS. 9A, 9B, and 9C depict perspective, front, and side views, respectively, of a fifth embodiment of a forming funnel, in accordance with the embodiments described herein.
Figure 9B:
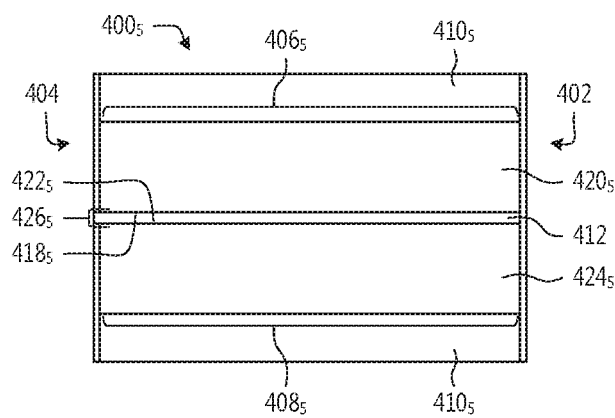
Figure 9C:
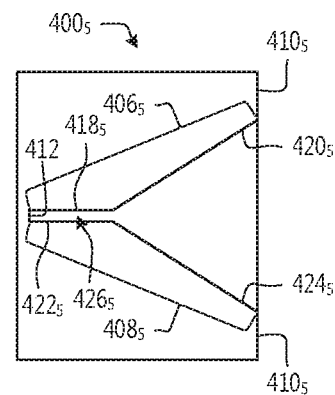

Depicted in FIGS. 9A, 9B, and 9C are perspective, front, and side views, respectively, of an embodiment of a forming funnel $400_5$ that can be used in place of any of the other forming funnels described herein. The forming funnel $400_5$ includes some similar components to those of the forming funnel $400_1$, including those components that are numbered with the same reference numbers. Those similar components include the closed end 402, the open end 404, the distal surface 412, the insertion direction 414, and the sliding direction 416. The forming funnel $400_5$ also includes an upper funneling surface $406_5$ and a lower funneling surface $408_5$. The forming funnel $400_5$ also includes front surfaces $410_5$.

The upper funneling surface $406_5$ includes a first portion $418_5$ and a second portion $420_5$. The upper funneling surface $406_5$ has a substantially constant cross section and extends from the closed end 402 to the open end 404. The lower funneling surface $408_5$ includes a first portion $422_5$ and a second portion $424_5$. The lower funneling surface $408_5$ has a substantially constant cross section and extends from the closed end 402 to the open end 404. In the depicted embodiment, the first portion $418_5$ of the upper funneling surface $406_5$ and the first portion $422_5$ of the lower funneling surface $408_5$ are substantially parallel to each other to form a slot $426_5$. In the depicted embodiment, the slot extends between the closed end 402 and the open end 404. In some embodiments, the slot $426_5$ is configured to constrain the opening of the mailer after the opening of the mailer is inserted in the insertion direction 414 and when the mailer is moved in the sliding direction 416. In the depicted embodiment, the second portion $420_5$ is a single planar surface that extends between the slot $426_5$ and the front surface $410_5$. Similarly, in the depicted embodiment, the second portion $424_5$ is a single planar surface that extends between the slot $426_5$ and the front surface $410_5$.

In the depicted embodiment, the second portion $420_5$ of the upper funneling surface $406_5$ and the second portion $424_5$ of the lower funneling surface $408_5$ are not parallel to each other. In addition, the second portion $420_5$ of the upper funneling surface $406_5$ and the second portion $424_5$ are not parallel to the first portions $418_5$ and $422_5$ that form the slot $426_5$. In the depicted arrangement, the upper and lower funneling surfaces $406_5$ and $408_5$ are further apart at the front surfaces $410_5$ than they are apart at the distal surface 412. This enables the upper and lower funneling surfaces $406_5$ and $408_5$ are configured to receive an opening of a mailer as the mailer is inserted in an insertion direction 414. In some cases, the opening of the mailer is inserted between the second portion $420_5$ of the upper funneling surface $406_5$ and the second portion $424_5$ of the lower funneling surface $408_5$ in the insertion direction 414. With the opening oriented toward the distal surface 412, the mailer can be inserted in the insertion direction 414 until the opening in in the slot $426_5$ and/or the mailer reaches the distal surface 412. During the insertion, top and bottom sides of the opening of the mailer contact the upper and lower funneling surfaces $406_5$ and $408_5$, respectively, to constrain the opening. After the mailer is inserted (e.g., after the opening of the mailer reaches the distal surface 412 or after the opening of the mailer is in the slot $426_5$), the mailer can be moved in a sliding direction 416 and the upper and lower funneling surfaces $406_5$ and $408_5$ continue to constrain the opening of the mailer (e.g., the slot $426_5$ continues to constrain the opening).

Dimensions and characteristics of the forming funnel $400_5$ may be selected based on a desired performance of the forming funnel $400_5$. In one example, the angle between the second portions $420_5$ and $424_5$ of the upper and lower funneling surfaces $406_5$ and $408_5$ may be selected based on a desired constraining of the opening of the mailer as the opening of the mailer is moved in the insertion direction 414. In another example, a vertical distance between the ends of the first portions $418_5$ and $422_5$ of the upper and lower funneling surfaces $406_5$ and $408_5$ may selected based on a desired constraining of the opening of the mailer in the slot $426_5$. In another example, a horizontal width of the slot $426_5$ may be selected based on a desired constraining of the opening of the mailer after the opening of the mailer has been inserted into the slot $426_5$.

Figure 10A:
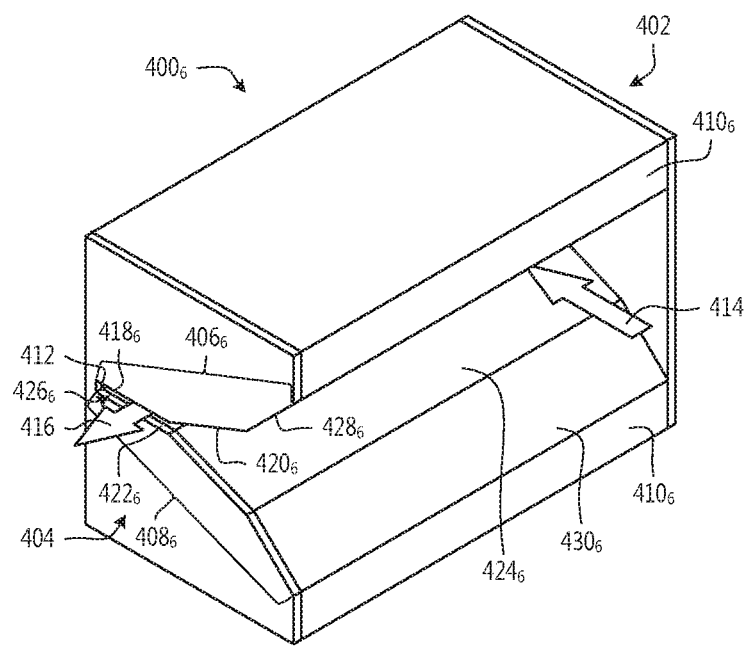
FIGS. 10A, 10B, and 10C depict perspective, front, and side views, respectively, of a sixth embodiment of a forming funnel, in accordance with the embodiments described herein.
Figure 10B:
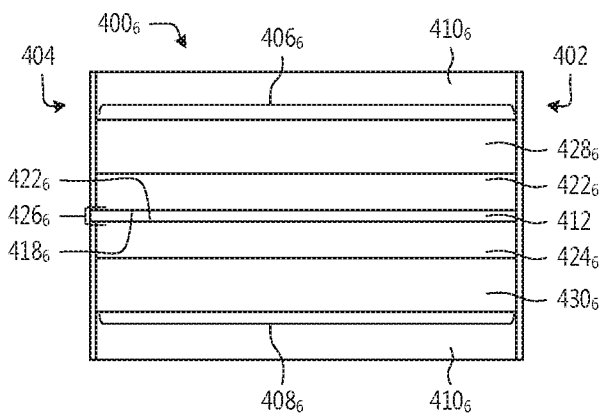
Figure 10C:
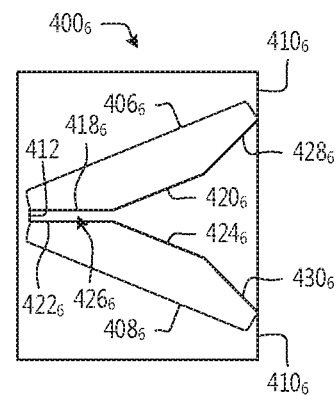

Depicted in FIGS. 10A, 10B, and 100 are perspective, front, and side views, respectively, of an embodiment of a forming funnel $400_6$ that can be used in place of any of the other forming funnels described herein. The forming funnel $400_6$ includes some similar components to those of the forming funnel $400_1$, including those components that are numbered with the same reference numbers. Those similar components include the closed end 402, the open end 404, the distal surface 412, the insertion direction 414, and the sliding direction 416. The forming funnel $400_5$ also includes an upper funneling surface $406_6$ and a lower funneling surface $408_6$. The forming funnel $400_6$ also includes front surfaces $410_6$.

The upper funneling surface $406_6$ includes a first portion $418_6$, a second portion $420_6$, and a third portion $428_6$. The upper funneling surface $406_6$ has a substantially constant cross section and extends from the closed end 402 to the open end 404. The lower funneling surface $408_6$ includes a first portion $422_6$, a second portion $424_6$, and a third portion $430_6$. The lower funneling surface $408_6$ has a substantially constant cross section and extends from the closed end 402 to the open end 404. In the depicted embodiment, the first portion $418_6$ of the upper funneling surface $406_6$ and the first portion $422_6$ of the lower funneling surface $408_6$ are substantially parallel to each other to form a slot $426_6$. In the depicted embodiment, the slot $426_6$ extends between the closed end 402 and the open end 404. In some embodiments, the slot $426_6$ is configured to constrain the opening of the mailer after the opening of the mailer is inserted in the insertion direction 414 and when the mailer is moved in the sliding direction 416. In the depicted embodiment, the second portion $420_6$ is a single planar surface that extends between the slot $426_5$ and third portion $428_6$, and the third portion $428_6$ is a single planar surface that extends between the second portion $420_6$ and the front surface $410_6$. Similarly, in the depicted embodiment, the second portion $424_6$ is a single planar surface that extends between the slot $426_5$ and third portion $430_6$, and the third portion $430_6$ is a single planar surface that extends between the second portion $424_6$ and the front surface $410_6$.

In the depicted embodiment, the second portion $420_6$ of the upper funneling surface $406_6$, the third portion $428_6$ of the upper funneling surface $406_6$, the second portion $424_6$ of the lower funneling surface $408_6$, and the third portion $430_6$ of the lower funneling surface $408_6$ are not parallel to each other. In addition, the second portion $420_6$ of the upper funneling surface $406_6$, the third portion $428_6$ of the upper funneling surface $406_6$, the second portion $424_6$ of the lower funneling surface $408_6$, and the third portion $430_6$ of the lower funneling surface $408_6$ are not parallel to the first portions $418_6$ and $422_6$ that form the slot $4266_5$. In the depicted arrangement, the upper and lower funneling surfaces $406_6$ and $408_6$ are further apart at the front surfaces $410_6$ than they are apart at the distal surface 412. This enables the upper and lower funneling surfaces $406_6$ and $408_6$ are configured to receive an opening of a mailer as the mailer is inserted in an insertion direction 414. In some cases, the opening of the mailer is inserted between the second and third portions $420_6$ and $428_6$ of the upper funneling surface $406_6$ and the second and third portions $424_6$ and $430_6$ of the lower funneling surface $408_6$ in the insertion direction 414. With the opening oriented toward the distal surface 412, the mailer can be inserted in the insertion direction 414 until the opening in in the slot $426_6$ and/or the mailer reaches the distal surface 412. During the insertion, top and bottom sides of the opening of the mailer contact the upper and lower funneling surfaces $406_6$ and $408_6$, respectively, to constrain the opening. After the mailer is inserted (e.g., after the opening of the mailer reaches the distal surface 412 or after the opening of the mailer is in the slot $426_6$), the mailer can be moved in a sliding direction 416 and the upper and lower funneling surfaces $406_6$ and $408_6$ continue to constrain the opening of the mailer (e.g., the slot $426_6$ continues to constrain the opening).

Dimensions and characteristics of the forming funnel $400_6$ may be selected based on a desired performance of the forming funnel $400_6$. In one example, the angle between the second portions $420_6$ and $424_6$ of the upper and lower funneling surfaces $406_6$ and $408_6$ and/or the angle between the third portions $428_6$ and $430_6$ of the upper and lower funneling surfaces $406_5$ and $408_5$ may be selected based on a desired constraining of the opening of the mailer as the opening of the mailer is moved in the insertion direction 414. In another example, a vertical distance between the ends of the first portions $418_6$ and $422_6$ of the upper and lower funneling surfaces $406_6$ and $408_6$ may selected based on a desired constraining of the opening of the mailer in the slot $426_6$. In another example, a vertical distance between the point at which the second and third portions $422_6$ and $428_6$ of the upper funneling surfaces $406_6$ and $408_6$ meet and the point at which the second and third portions $424_6$ and $430_6$ of the upper funneling surfaces $406_6$ and $408_6$ meet may selected based on a desired constraining of the opening of the mailer by the upper and lower funneling surfaces $406_6$ and $408_6$. In another example, a horizontal width of the slot $426_5$ may be selected based on a desired constraining of the opening of the mailer after the opening of the mailer has been inserted into the slot $426_5$. In another example, horizontal width a between the point at which the second and third portions $422_6$ and $428_6$ of the upper funneling surfaces $406_6$ and $408_6$ meet and the point at which the second and third portions $424_6$ and $430_6$ of the upper funneling surfaces $406_6$ and $408_6$ meet may selected based on a desired constraining of the opening of the mailer by the upper and lower funneling surfaces $406_6$ and $408_6$.

Figure 11A:
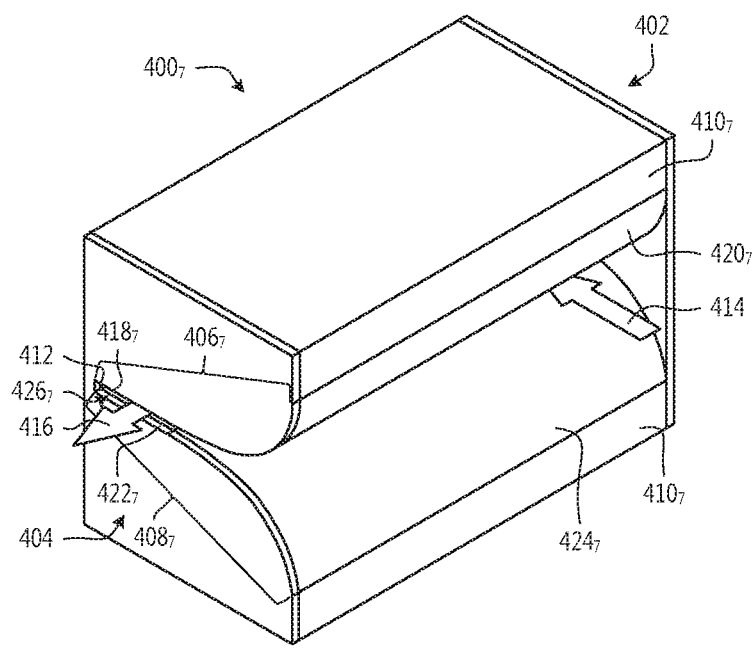
FIGS. 11A, 11B, and 11C depict perspective, front, and side views, respectively, of a seventh embodiment of a forming funnel, in accordance with the embodiments described herein.
Figure 11B:
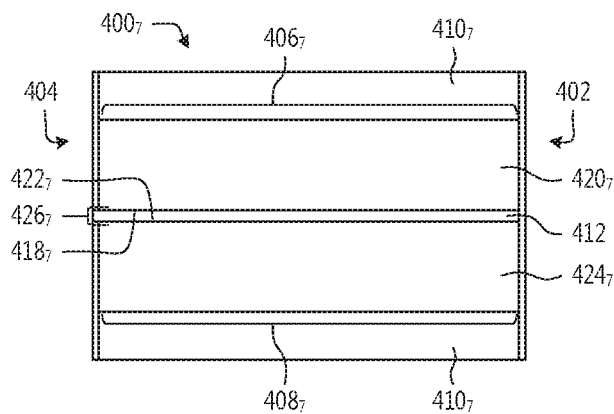
Figure 11C:
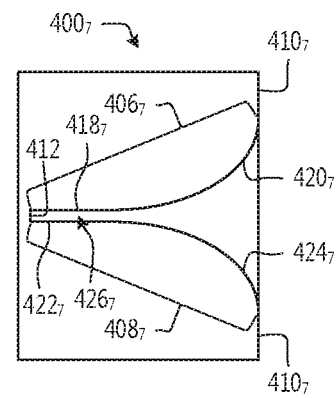

Depicted in FIGS. 11A, 11B, and 11C are perspective, front, and side views, respectively, of an embodiment of a forming funnel $400_7$ that can be used in place of any of the other forming funnels described herein. The forming funnel $400_7$ includes some similar components to those of the forming funnel $400_1$, including those components that are numbered with the same reference numbers. Those similar components include the closed end 402, the open end 404, the distal surface 412, the insertion direction 414, and the sliding direction 416. The forming funnel $400_7$ also includes an upper funneling surface $406_7$ and a lower funneling surface $408_7$. The forming funnel $400_7$ also includes front surfaces $410_7$.

The upper funneling surface $406_7$ includes a first portion $418_7$ and a second portion $420_7$. The upper funneling surface $406_7$ has a substantially constant cross section and extends from the closed end 402 to the open end 404. The lower funneling surface $408_7$ includes a first portion $422_7$ and a second portion $424_7$. The lower funneling surface $408_7$ has a substantially constant cross section and extends from the closed end 402 to the open end 404. In the depicted embodiment, the first portion $418_7$ of the upper funneling surface $406_7$ and the first portion $422_7$ of the lower funneling surface $408_7$ are substantially parallel to each other to form a slot $426_7$. In the depicted embodiment, the slot $426_7$ extends between the closed end 402 and the open end 404. In some embodiments, the slot $426_5$ is configured to constrain the opening of the mailer after the opening of the mailer is inserted in the insertion direction 414 and when the mailer is moved in the sliding direction 416. In the depicted embodiment, the second portion $420_7$ is a contoured surface that extends between the slot $426_7$ and the front surface $410_7$. Similarly, in the depicted embodiment, the second portion $424_5$ is a contoured surface that extends between the slot $426_7$ and the front surface $410_7$.

In the depicted arrangement, the upper and lower funneling surfaces $406_7$ and $408_7$ are further apart at the front surfaces $410_7$ than they are apart at the distal surface 412. This enables the upper and lower funneling surfaces $406_7$ and $408_7$ to be configured to receive an opening of a mailer as the mailer is inserted in an insertion direction 414. In some cases, the opening of the mailer is inserted between the second portion $420_7$ of the upper funneling surface $406_7$ and the second portion $424_7$ of the lower funneling surface $408_7$ in the insertion direction 414. With the opening oriented toward the distal surface 412, the mailer can be inserted in the insertion direction 414 until the opening in in the slot $426_5$ and/or the mailer reaches the distal surface 412. During the insertion, top and bottom sides of the opening of the mailer contact the upper and lower funneling surfaces $406_7$ and $408_7$, respectively, to constrain the opening. After the mailer is inserted (e.g., after the opening of the mailer reaches the distal surface 412 or after the opening of the mailer is in the slot $426_7$), the mailer can be moved in a sliding direction 416 and the upper and lower funneling surfaces $406_7$ and $408_7$ continue to constrain the opening of the mailer (e.g., the slot $426_7$ continues to constrain the opening).

Dimensions and characteristics of the forming funnel $400_7$ may be selected based on a desired performance of the forming funnel $400_7$. In one example, the curvature of the contoured surfaces of the second portions $420_7$ and $424_7$ of the upper and lower funneling surfaces $406_5$ and $408_5$ may be selected based on a desired constraining of the opening of the mailer as the opening of the mailer is moved in the insertion direction 414. In another example, a vertical distance between the ends of the first portions $418_7$ and $422_7$ of the upper and lower funneling surfaces $406_7$ and $408_7$ may selected based on a desired constraining of the opening of the mailer in the slot $426_7$. In another example, a horizontal width of the slot $426_7$ may be selected based on a desired constraining of the opening of the mailer after the opening of the mailer has been inserted into the slot $426_7$.

Depicted in FIGS. 12A to 12E are instances of an embodiment of a method closing an opening of a mailer using a forming funnel and a fusing device. In particular, FIGS. 12A to 12E depict a system 500 that includes the fusing device 200 and the forming funnel $400_5$. The fusing device 200 and the forming funnel $400_5$ are arranged so that the open end 404 of the forming funnel $400_5$ is oriented toward the end of the fusing device 200 that includes the inlet 206 into the slot 202. In the depicted embodiment, the upper divergent surface 210 and the upper funneling surface $406_5$ have similar cross sections and the lower divergent surface 212 and the lower funneling surface $408_5$ have similar cross sections. In other embodiments, the upper divergent surface 210 and the upper funneling surface $406_5$ may have different cross sections and the lower divergent surface 212 and the lower funneling surface $408_5$ may have different cross sections. In the depicted embodiment, the fusing device 200 and the forming funnel 400₅ are merely placed next to each other on a surface (e.g., a work table). In other embodiments, the fusing device 200 and the forming funnel 400₅ may be fixedly coupled to each other, releasably coupled to each other, fixedly coupled to the surface, or otherwise coupled to deter respective movements of the fusing device 200 and the forming funnel 400₅.

FIGS. 12A to 12E also depict a cushioned mailer 510 in the system 500. The cushioned mailer 510 has an outer layer and an inner cushioning layer. In the depicted embodiment, the outer layer is Kraft paper and the inner cushioning layer is a polyethylene-based air cellular material. The cushioned mailer 510 has an opening 512 between two sides of the cushioned mailer 510. In the depicted embodiment, the other three sides of the cushioned mailer 510 are closed (e.g., sealed together, folded, creased, etc.). The cushioned mailer 510 is capable of holding an object 520. The method depicted in FIGS. 12A to 12E depicts closing the opening of the cushioned mailer 510 with the object 520 inside using the forming funnel 400₅ and the fusing device 200.

Figure 12A:
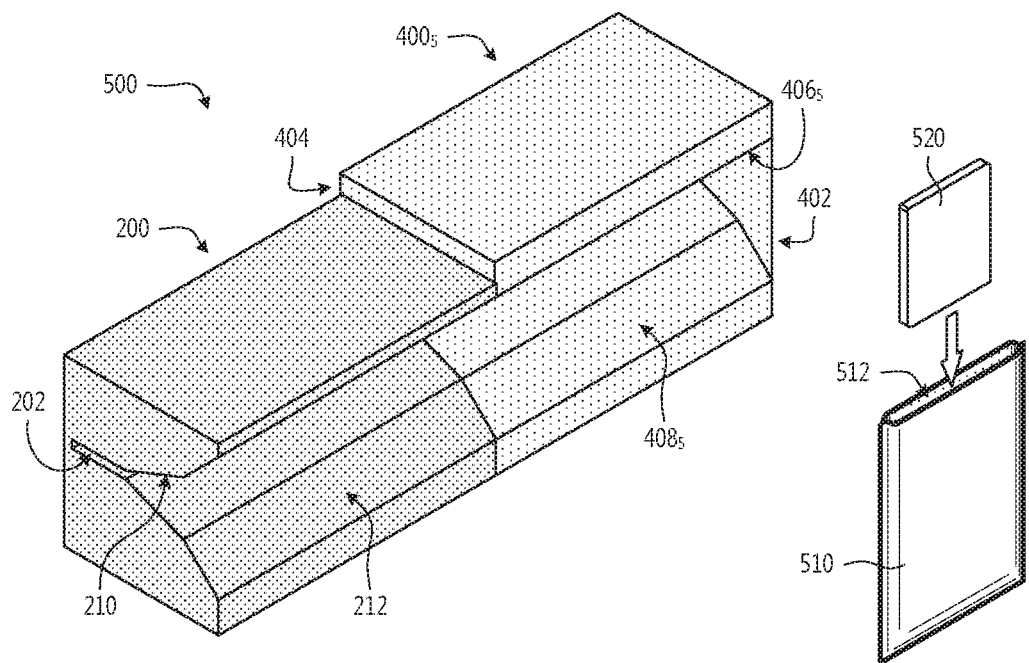
FIGS. 12A to 12E depict an embodiment instances of an embodiment of a method closing an opening of a mailer using a forming funnel and a fusing device, in accordance with the embodiments described herein.

In FIG. 12A, the object 520 is inserted through the opening 512 of the cushioned mailer 510 and into the cushioned mailer 510 between the cushioning layer on either side of the cushioned mailer 510. Prior to this step, a user may have selected the cushioned mailer 510, such as by pulling the cushioned mailer 510 from a source of mailers. In the case of an e-commerce shipping facility, the user may have also obtained the object 520 from an inventory bin or other container. After the object 520 is inserted into the cushioned mailer 510, the user can manually orient the cushioned mailer 510 in the location shown in FIG. 12B. In that instance, the opening 512 of the cushioned mailer 510 is oriented toward the slot 426₅ (which is not visible in FIG. 12B) between the upper and lower funneling surfaces 406₅ and 408₅.

Figure 12B:
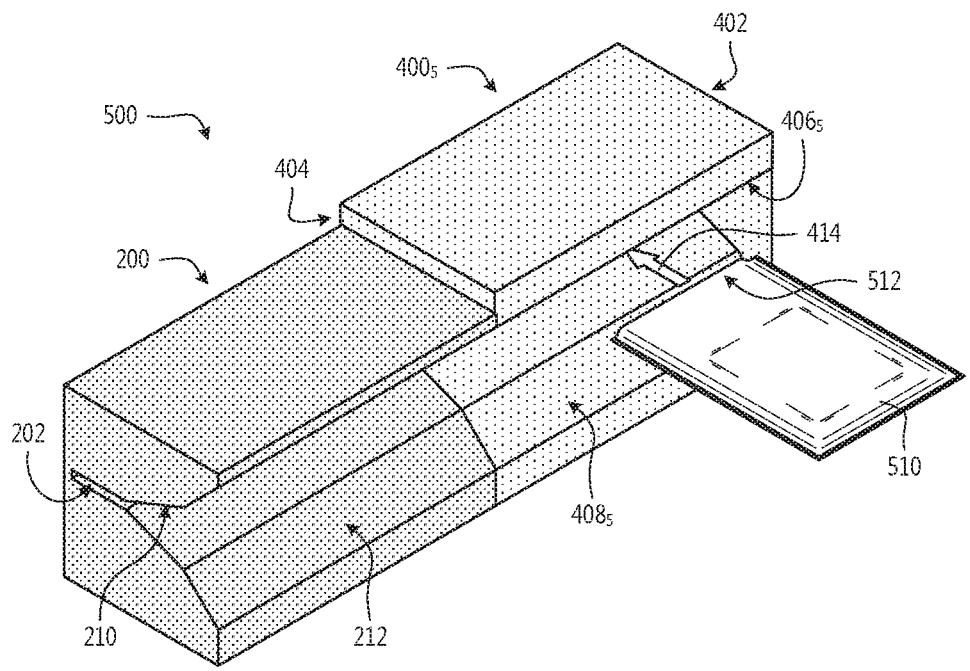
Figure 12C:
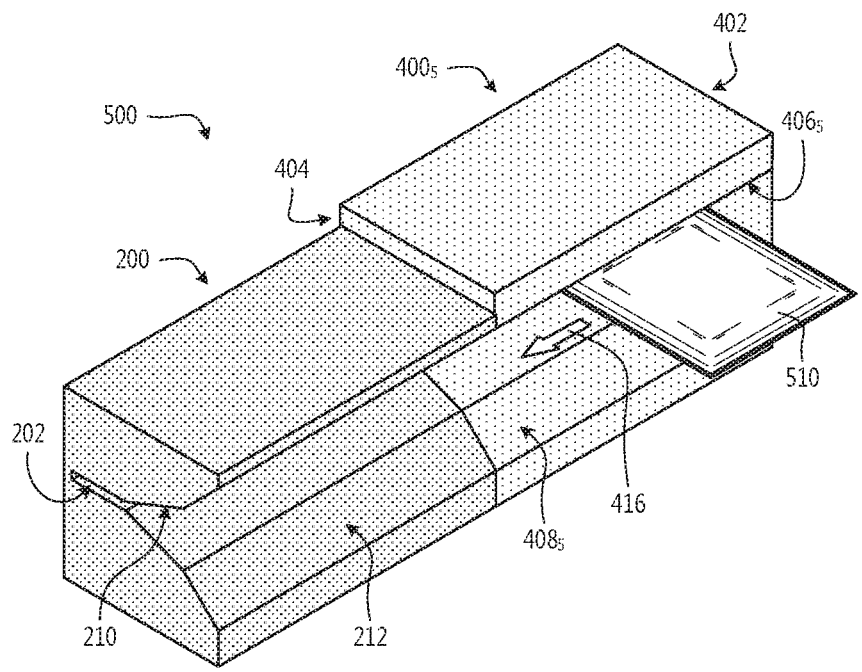

From the position shown in FIG. 12B, the cushioned mailer 510 can be moved in the insertion direction 414 so that the opening 512 of the cushioned mailer 510 is inserted between the upper and lower funneling surfaces 406₅ and 408₅ to the point shown in FIG. 12C. As the opening 512 of the cushioned mailer 510 is inserted (e.g., as the mailer 510 is moved between the instances shown in FIGS. 12B and 12C), the upper and lower funneling surfaces 406₅ and 408₅ constrain the top and bottom sides of the cushion mailer 510 to deflect it from its natural resting position. After the opening 512 of the mailer 510 is inserted (e.g., after the mailer 510 reaches the position shown in FIG. 12C), the upper and lower funneling surfaces 406₅ and 408₅ continue to constrain the top and bottom sides of the cushion mailer 510. In the instance shown in FIG. 12C, the opening 512 may be abutting the distal surface 412 of the slot 426₅. In the depicted embodiment, the opening 512 of the cushioned mailer 510 is inserted between the upper and lower funneling surfaces 406₅ and 408₅ near the closed end 402 of the forming funnel 400₅.

From the position shown in FIG. 12C, the cushioned mailer 510 can be slid in the sliding direction 416. The upper and lower funneling surfaces 406₅ and 408₅ are configured to continue constraining the opening 512 of the cushioned mailer 510 as the cushioned mailer 510 is slid in the sliding direction 416. In the depicted embodiment, the sliding direction 416 is substantially perpendicular to the insertion direction 414. The cushioned mailer 510 can be slid in the sliding direction 416 from the position shown in FIG. 12C, where the opening 512 of the cushioning mailer 510 is in the slot 426₅ of the forming funnel 400₅, to the position shown in FIG. 12D, where the opening 512 of the cushioning mailer 510 is in the slot 202 of the fusing device 200. During this sliding of the cushioned mailer 510, the upper and lower funneling surfaces 406₅ and 408₅ are configured to continue constraining the opening 512 of the cushioned mailer 510 as the cushioned mailer 510 is slid in the sliding direction 416 and out of the open end 404 of the forming funnel 400₅. The slot 202 receives the constrained opening 512 of the cushioned mailer 510 from the forming funnel 400₅ through the inlet 206 as the mailer 510 continues to move in the sliding direction 416.

Figure 12D:
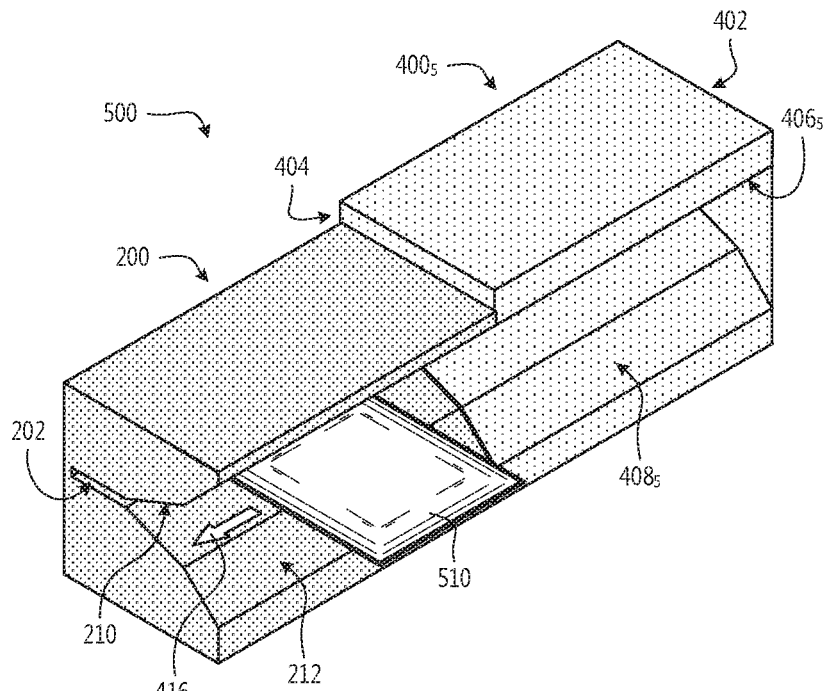
Figure 12E:
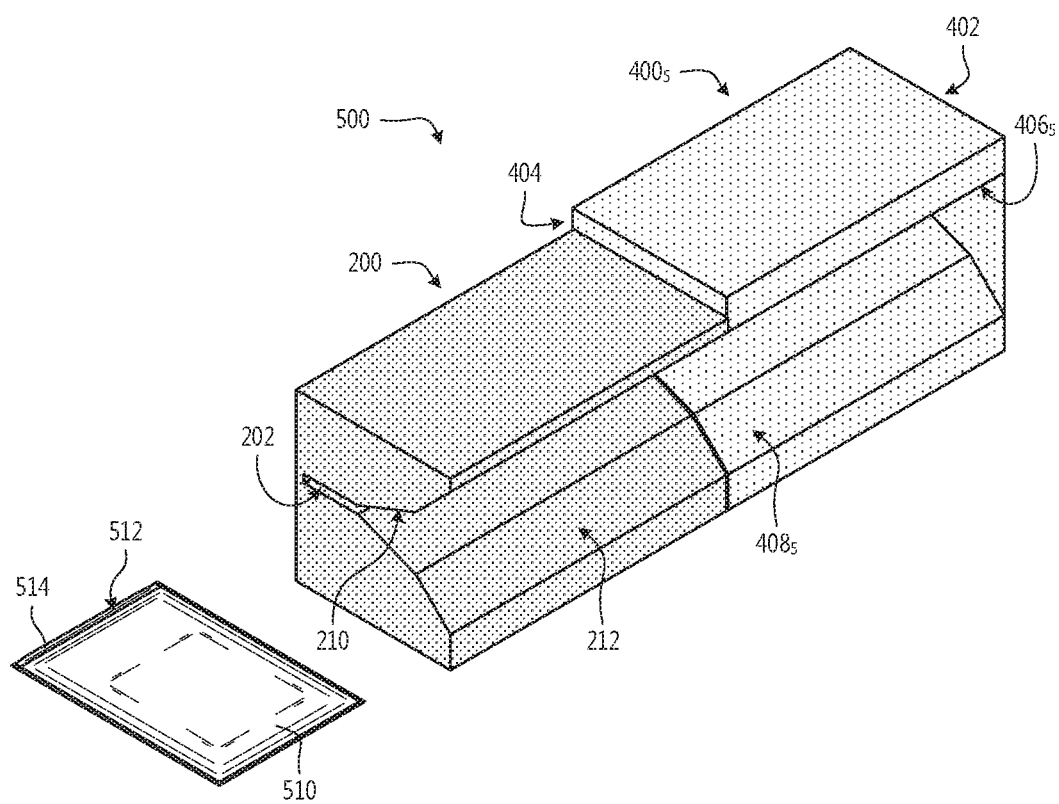

As the opening 512 of the cushioning mailer 510 is in the slot 202 of the fusing device 200, such as in the location shown in FIG. 12D, the fusing device 200 applies pressure to the exterior of the opening 512 of the mailer 510 and heat to the opening 512 of the mailer 510. In the depicted embodiment, the upper and lower sets of rollers 214 and 216 of the fusing device 200 apply pressure to the top and bottom exterior surfaces of the opening 512 of the mailer 510 as the mailer 510 is slid through the slot 202. Also in the depicted embodiment, the upper and lower heating elements 228 and 230 apply heat to the opening 512 of the mailer 510 as the mailer 510 is slid through the slot 202. In some embodiments, the fusing device 200 includes the conveying system 218 that conveys the opening 512 of the mailer 510 through a portion of the slot 202. As the user manually slides the mailer 510 in the sliding direction 416, the opening 512 of the mailer 510 will come into contact with the conveying system 218 and then the mailer 510 can be moved in the sliding direction 416 by the conveying system 218. In the depicted embodiment, the opening 512 of the mailer 510 will is moved manually in the sliding direction 416 until the opening 512 comes into contact with the continuous band 220 of the conveying system 218. The continuous band 520 is driven by the driving mechanism 224 to cause the opening 512 of the mailer 510 to be moved in the sliding direction 416 by the continuous band 220 through the portion of the slot 202 that includes the upper and lower sets of rollers 214 and 216. The momentum imparted by the conveying system 218 may cause the mailer 510 to be slid in the sliding direction 416 until the mailer 510 has been discharged from the fusing device 200 to the location shown in FIG. 12E.

The pressure and heat applied by the fusing device 200 as the opening 512 of the mailer 510 is moved through the slot 202 cause portions of the opening 512 to fuse together to close the mailer 510. In the depicted embodiment, the heat applied by the fusing device 200 causes some of the air cellular cushioning material to become soft or molten and the pressure applied by the fusing device 200 causes the soft or molten portions of the air cellular cushioning material to fuse together, creating a heat seal 514 that closes the opening 512 of the mailer 510. In the depicted embodiment, the heat seal 514 extends across the entire opening 512 of the mailer 510. In other embodiments, the heat seal 514 or any other fusing of the opening 512 of the mailer 510 may not extend across the entirety of the opening 512, but portions of the opening 512 may be fused to close the opening 512 so that the object 520 is not able to be removed from the opening 512 without deforming a portion of the mailer 510.

Figure 13:
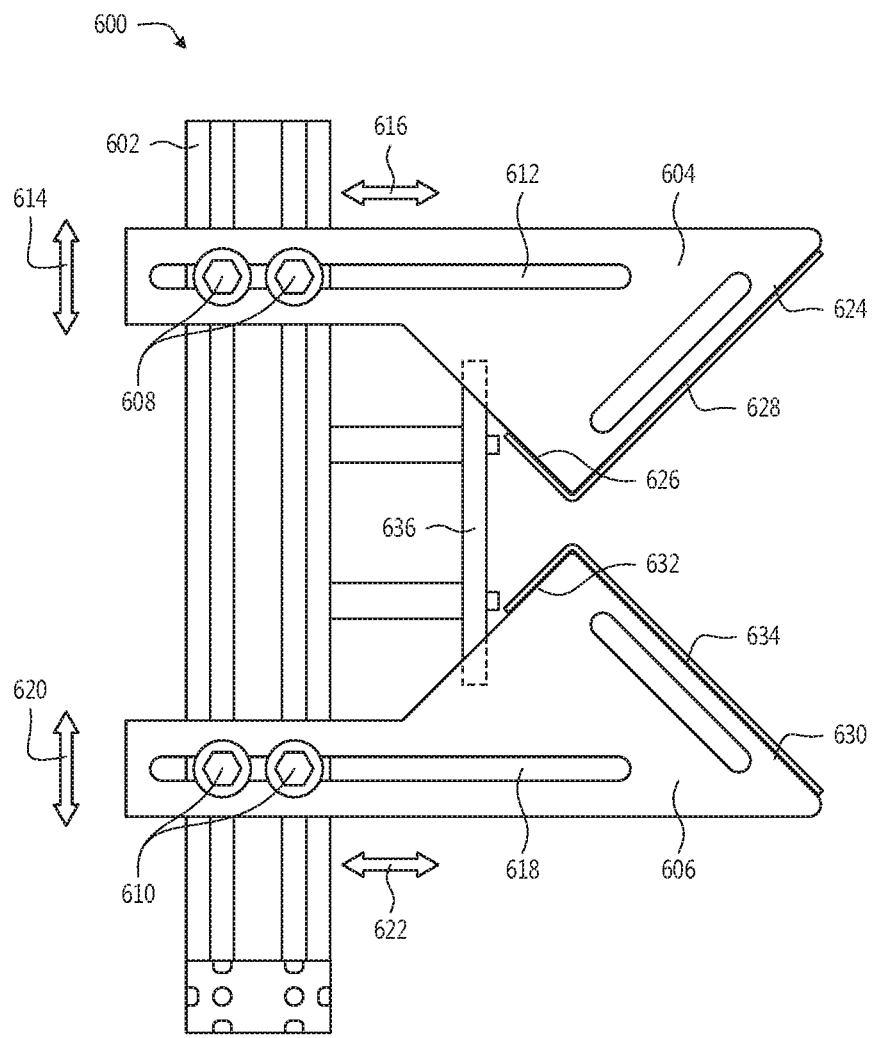
FIG. 13 depicts a side view of an embodiment of a forming funnel that has funneling surfaces that are moveable with respect to each other and with respect to a distal surface, in accordance with the embodiments described herein.

The embodiments of forming funnels described above have fixed surface funneling surfaces and fixed distal surfaces. In other embodiments, a forming funnel may have funneling surfaces that are moveable with respect to each other and with respect to a distal surface of the forming funnel. Depicted in FIG. 13 is side view of an embodiment of a forming funnel 600 that has funneling surfaces that are moveable with respect to each other and with respect to a distal surface.

The forming funnel 600 includes and upright guide 602 with an upper support 604 and a lower support 606 coupled to the upright guide 602. In the depicted embodiment, the upper support 604 is coupled to the upright guide 602 by fasteners 608 and the lower support is coupled to the upright guide 602 by fasteners 610. The fasteners 608 and 610 are bolts in the depicted embodiment, but could be any other type of fastener (e.g., a spring pin, a latch, a quick-release clip, etc.). The upper support 604 includes a slot 612 through which the fasteners 608 pass to couple the upper support 604 to the upright guide 602. The fasteners 608 can be loosened to permit the upper support 604 be repositioned vertically 614 along the upright guide 602 and/or horizontally 616 within the slot 612. The lower support 606 includes a slot 618 through which the fasteners 610 pass to couple the lower support 606 to the upright guide 602. The fasteners 610 can be loosened to permit the lower support 606 be repositioned vertically 620 along the upright guide 602 and/or horizontally 622 within the slot 618.

The upper support 604 includes a first edge 624 and a second edge 626. An upper funneling surface 628 is coupled to portions of the first and second edges 624 and 626 of the upper support 604. In the depicted embodiment, the upper funneling surface 628 is bent so that portions of the upper funneling surface 628 cover portions of the first and second edges 624 and 626. The lower support 406 includes a first edge 630 and a second edge 632. A lower funneling surface 634 is coupled to portions of the first and second edges 630 and 632 of the lower support 406. In the depicted embodiment, the lower funneling surface 634 is bent so that portions of the lower funneling surface 634 cover portions of the first and second edges 630 and 632. The forming funnel 600 includes a distal surface 636 that is coupled to the upright guide 602. In the depicted embodiment, the upright guide is fixedly coupled to the upright guide 602. The upper and lower funneling surfaces 628 and 634 may be FIG. 13 depicts only one upright guide 602, one upper support 604, and one lower support 606. In some embodiments, the forming funnel 600 includes another upright guide, another upper support, and another lower support that are not visible in FIG. 13 because they located behind the upright guide 602, the upper support 604, and the lower support 606. In these embodiments, the distal surface may be coupled to both the upright guide 602 and the other upright guide, the upper funneling surface 628 may be coupled to the upper support 604 and the other upper support, and the lower funneling surface 634 may be coupled to the lower support 606 and the other lower support.

Because the upper and lower supports 604 and 606 are movable with respect to the upright guide 602, the upper and lower funneling surfaces 628 and 634 are movable with respect to each other and with respect to the distal surface 636. More specially, the upper support 604 is moveable vertically 614 and horizontally 616 with respect to the upright guide 602 so that the upper support 604 can be move toward and away from the lower support 606 and toward and away from the distal surface 636. Also, the lower support 606 is moveable vertically 620 and horizontally 622 with respect to the upright guide 602 so that the lower support 606 can be move toward and away from the upper support 604 and toward and away from the distal surface 636. In addition, the angles between the upper and lower surfaces 628 and 634 can also be adjusted. This adjustability allows users to set dimensions of the forming funnel 600 based on any number of situations, such as the size of mailers to be used with the forming funnel 600, the size of a slot (e.g., the slot 202) of a fusing device (e.g., fusing device 200), the size of objects placed in the mailers to be used with the forming funnel 600, and the like.

For purposes of this disclosure, terminology such as "upper," "lower," "vertical," "horizontal," "inwardly," "outwardly," "inner," "outer," "front," "rear," and the like, should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Unless stated otherwise, the terms "substantially," "approximately," and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A system comprising:
a forming funnel comprising funneling surfaces arranged to receive an opening of a mailer in an insertion direction between the funneling surfaces and to constrain the opening of the mailer after the opening of the mailer is inserted between the funneling surfaces, wherein the funneling surfaces are arranged such that, after the opening of the mailer is inserted between the funneling surfaces, the funneling surfaces continue to constrain the opening of the mailer as the mailer is moved in a sliding direction; and
a fusing device comprising a slot configured to receive the constrained opening of the mailer from the forming funnel as the mailer is moved in the sliding direction, wherein the fusing device is configured to apply pressure to an exterior of the opening of the mailer as the opening of the mailer is moved through the slot and to apply heat to the opening of the mailer as the opening of the mailer is moved through the slot, wherein the pressure and the heat applied by the fusing device cause portions of the opening to fuse together to close the mailer;
wherein the fusing device further comprises:
a first set of rollers on a first side of the slot, wherein the first set of rollers is configured to contact a first side of the exterior of the opening of the mailer as the opening of the mailer is moved through the slot, and
a second set of rollers on a second side of the slot, wherein the second set of rollers is configured to contact a second side of the exterior of the opening of the mailer as the opening of the mailer is moved through the slot, wherein the first and second sets of rollers are configured to apply the pressure to the exterior of the opening of the mailer.

2. The system of claim 1, wherein the fusing device further comprises:
a conveying system configured to convey the opening of the mailer through the at least a portion of the slot that includes the first and second sets of rollers.

3. The system of claim 2, wherein the conveying system includes a continuous band arranged to pass along the first set of rollers.

4. The system of claim 3, further comprising a driving system configured to drive the continuous band.

5. The system of claim 4, wherein the mailer is configured to be inserted into the forming funnel manually and moved in the sliding direction manually until the opening of the mailer reaches the continuous band, and wherein the driving of the continuous band moves the mailer in the sliding direction through the first and second sets of rollers.

6. The system of claim 1, wherein the exterior of the opening of the mailer include a first ply of paper on the first side of the exterior of the opening and a second ply of paper on the second side of the exterior of the opening, wherein an inner surface of each of the first and second plies of paper has an air cellular material adhered thereto.

7. The system of claim 6, wherein the pressure and the heat applied to the opening of the mailer causes at least a portion of the air cellular material on the first ply of paper to fuse with at least a portion of the air cellular material on the second ply of paper.

8. The system of claim 6, wherein the portions of the opening fused together to close the mailer include a heat seal in the air cellular material on the first and second plies of paper, wherein the heat seal is formed by the pressure and the heat applied by the fusing device.

9. The system of claim 1, wherein the fusing device further comprises:
an upper heating element configured to apply heat to an upper side of the opening of the mailer; and
a lower heating element configured to apply heat to a lower side of the opening of the mailer.

10. The system of claim 9, wherein the fusing device further comprises:
an upstream set of nip rollers located upstream of the upper and lower heating elements, wherein the upstream set of nip rollers are configured to apply pressure to the opening of the mailer before the opening of the mailer passes between the upper and lower heating elements; and
a downstream set of nip rollers located downstream of the upper and lower heating elements, wherein the downstream set of nip rollers are configured to apply pressure to the opening of the mailer after the opening of the mailer passes between the upper and lower heating elements.

11. The system of claim 1, wherein the insertion direction is substantially perpendicular to the sliding direction.

12. A forming funnel comprising:
a closed end;
an open end;
a first funneling surface extending between the closed end and the open end; and
a second funneling surface extending between the closed end and the open end;
wherein the first and second funneling surfaces are arranged to receive an opening of a mailer in an insertion direction between the first and second funneling surfaces;
wherein the first and second funneling surfaces are arranged to constrain a first side of the opening of the mailer and a second side of the opening of the mailer, respectively, as the opening of the mailer is inserted between the first and second funneling surfaces; and
wherein the first and second funneling surfaces are arranged such that, after the opening of the mailer is inserted between the first and second funneling surfaces, the mailer can be moved in a sliding direction while the first and second funneling surfaces continue constraining the first and second sides of the opening;
wherein each of the first and second funneling surfaces has a substantially constant cross section between the closed end and the open end;
wherein portions of the first and second funneling surfaces are substantially parallel to each other to form a slot that extends between the closed end and the open end, wherein the slot is configured to constrain the opening of the mailer when the mailer is moved in the sliding direction;
wherein:
a portion of the first funneling surface between the slot and a front of the forming funnel includes a first planar surface;
a portion of the second funneling surface between the slot and the front of the forming funnel includes a second planar surface;
the first planar surface and the second planar surface are not parallel to each other; and
each of the first and second planar surfaces is not parallel to the portions of the first and second funneling surfaces that form the slot and
wherein:
the portion of the first funneling surface between the slot and the front of the forming funnel further includes a third planar surface, wherein the first and third planar surfaces are not parallel to each other;
the portion of the second funneling surface between the slot and the front of the forming funnel includes a fourth planar surface, wherein the second and fourth planar surfaces are not parallel to each other;
the third planar surface and the fourth planar surface are not parallel to each other; and
each of the third and fourth planar surfaces is not parallel to the portions of the first and second funneling surfaces that form the slot.

13. The forming funnel of claim 12, wherein the open end is configured to permit the mailer to be slid out of the forming funnel in the sliding direction.

14. The forming funnel of claim 12, wherein:
a portion of the first funneling surface between the slot and a front of the forming funnel includes a first contoured surface;
a portion of the second funneling surface between the slot and the front of the forming funnel includes a second contoured surface.

15. A forming funnel comprising:
a closed end;
an open end;
a first funneling surface extending between the closed end and the open end; and
a second funneling surface extending between the closed end and the open end;

wherein the first and second funneling surfaces are arranged to receive an opening of a mailer in an insertion direction between the first and second funneling surfaces;

wherein the first and second funneling surfaces are arranged to constrain a first side of the opening of the mailer and a second side of the opening of the mailer, respectively, as the opening of the mailer is inserted between the first and second funneling surfaces; and wherein the first and second funneling surfaces are arranged such that, after the opening of the mailer is inserted between the first and second funneling surfaces, the mailer can be moved in a sliding direction while the first and second funneling surfaces continue constraining the first and second sides of the opening; and wherein:
- a first portion of the first funneling surface has a substantially constant cross section;
- a second portion of the first funneling surface has a non-constant cross section;
- the first portion of the first funneling surface extends between the closed end and the second portion;
- the second portion of the first funneling surface extends between the first portion and the open end; and
- an average distance between the first and second funneling surfaces at the open end is less than an average distance between the first and second funneling surface at the closed end.

16. The forming funnel of claim 15, wherein:
a first portion of the second funneling surface has a substantially constant cross section;
a second portion of the second funneling surface has a non-constant cross section;
the first portion of the second funneling surface extends between the closed end and the first portion; and
the second portion of the first funneling surface extends between the first portion and the open end.

17. The forming funnel of claim 15, wherein the second funneling surface has a substantially constant cross section.

18. A forming funnel comprising:
a closed end;
an open end;
a first funneling surface extending between the closed end and the open end; and
a second funneling surface extending between the closed end and the open end;
wherein the first and second funneling surfaces are arranged to receive an opening of a mailer in an insertion direction between the first and second funneling surfaces;
wherein the first and second funneling surfaces are arranged to constrain a first side of the opening of the mailer and a second side of the opening of the mailer, respectively, as the opening of the mailer is inserted between the first and second funneling surfaces; and
wherein the first and second funneling surfaces are arranged such that, after the opening of the mailer is inserted between the first and second funneling surfaces, the mailer can be moved in a sliding direction while the first and second funneling surfaces continue constraining the first and second sides of the opening; and
wherein at least one of the first and second funneling surfaces is movable with respect to the other of the first and second funneling surfaces.

* * * * *